US006898301B2

(12) United States Patent
Iwanaga

(10) Patent No.: US 6,898,301 B2
(45) Date of Patent: May 24, 2005

(54) AUTHENTICATION SYSTEM BASED ON FINGERPRINT AND ELECTRONIC DEVICE EMPLOYED FOR THE SYSTEM

(75) Inventor: Masakuni Iwanaga, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 689 days.

(21) Appl. No.: 09/901,549

(22) Filed: Jul. 9, 2001

(65) Prior Publication Data

US 2002/0003892 A1 Jan. 10, 2002

(30) Foreign Application Priority Data

Jul. 10, 2000 (JP) ........................................ 2000-208911
Dec. 14, 2000 (JP) ........................................ 2000-380310

(51) Int. Cl.[7] .............................................. G06K 9/00
(52) U.S. Cl. ........................... 382/124; 356/71; 283/68
(58) Field of Search ................................. 382/115–127; 283/68–69; 356/71

(56) References Cited

U.S. PATENT DOCUMENTS

| | | | | |
|---|---|---|---|---|
| 4,581,760 | A | | 4/1986 | Schiller et al. |
| 5,337,043 | A | * | 8/1994 | Gokcebay ................. 340/5.67 |
| 5,680,205 | A | * | 10/1997 | Borza .......................... 356/71 |
| 6,073,027 | A | * | 6/2000 | Norman et al. ........... 455/575.4 |
| 6,088,585 | A | * | 7/2000 | Schmitt et al. ............. 455/411 |
| 6,134,340 | A | * | 10/2000 | Hsu et al. ................... 382/124 |
| 6,151,485 | A | * | 11/2000 | Crisp ....................... 455/575.4 |
| 6,177,950 | B1 | * | 1/2001 | Robb ....................... 348/14.01 |
| 6,289,114 | B1 | * | 9/2001 | Mainguet ................... 382/124 |
| 6,366,682 | B1 | | 4/2002 | Hoffman et al. ............ 382/115 |
| 6,370,362 | B1 | * | 4/2002 | Hansen et al. ............. 455/90.1 |
| 6,532,035 | B1 | * | 3/2003 | Saari et al. ............... 348/14.02 |
| 6,668,071 | B1 | * | 12/2003 | Minkin et al. ............. 382/124 |
| 6,744,910 | B1 | * | 6/2004 | McClurg et al. ........... 382/124 |
| 2002/0146157 | A1 | * | 10/2002 | Goodman et al. .......... 382/127 |

FOREIGN PATENT DOCUMENTS

| | | |
|---|---|---|
| EP | 0 508 845 A2 | 10/1992 |
| JP | 05-095329 | 4/1993 |
| JP | 06-284182 | 10/1994 |
| JP | 2000-069154 | 3/2000 |

OTHER PUBLICATIONS

Related U.S. Appl. No. 09/468,663 filed Dec. 22, 1999, entitled "Apparatus and Method for Collating Image"; Inventors: T. Takeda et al.
S. Anderson et al: "A Single Chip Sensor & Image Processor for Fingerprint Verification", Proceedings of the IEEE 1991 Custom Integrated Circuits Conference, San Diego, California, May 12–15, 1991.
H. Yahagi et al: "Moving–Window Algorithm for Fast Fingerprint Verification", pp. 343–347, IEEE Proceedings Conference,, vol. 1, 90CH2883–7, Apr. 1–4, 1990, New Orleans, Louisiana.
J. Zhang et al: Face Recognition, Eigenface, Elastic Matching, and Neural Nets:, Proceedings of the IEEE, IEEE, New York, U.S.A., vol. 85, No. 9, Sep. 1, 1997, pp. 1423–1435, XP000738565, ISSN: 0018–9219; * p. 1427, left–hand column, 3rd paragraph—right–hand column, penultimate paragraph*.

* cited by examiner

Primary Examiner—Bhavesh M. Mehta
Assistant Examiner—Aaron Carter
(74) Attorney, Agent, or Firm—Frishauf, Holtz, Goodman & Chick, P.C.

(57) ABSTRACT

Image pickup window is provided at main body of cellular phone. Image pickup element is moved in accordance with switching between an ordinary imaging mode and a fingerprint imaging mode. Infinite object is focused in the ordinary imaging mode and proximate object is focused in the fingerprint imaging mode. Thus, infinite object and proximate object can be picked up by the same optical system.

12 Claims, 17 Drawing Sheets

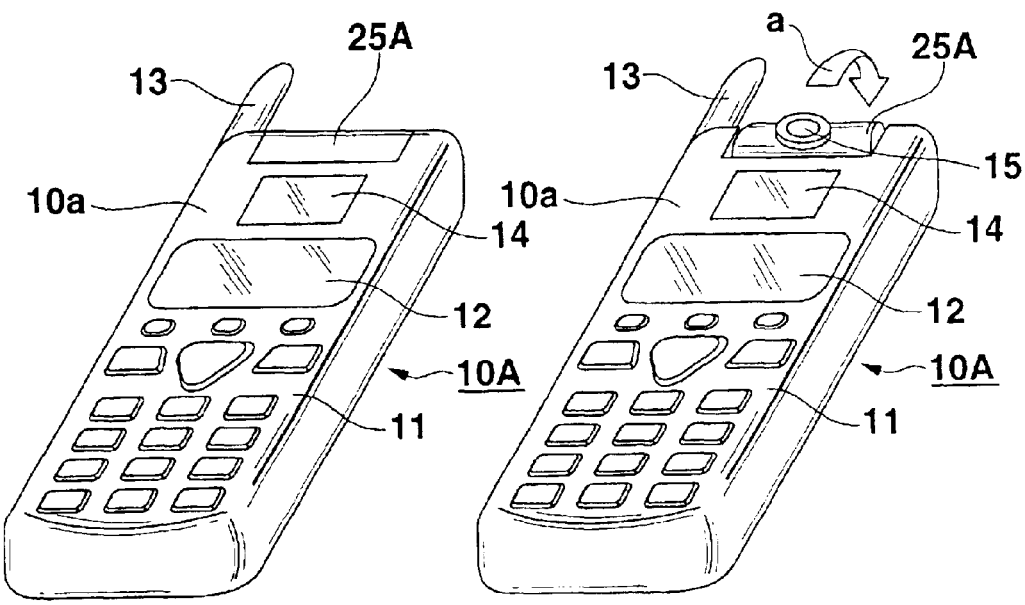
FIG.5A  FIG.5B
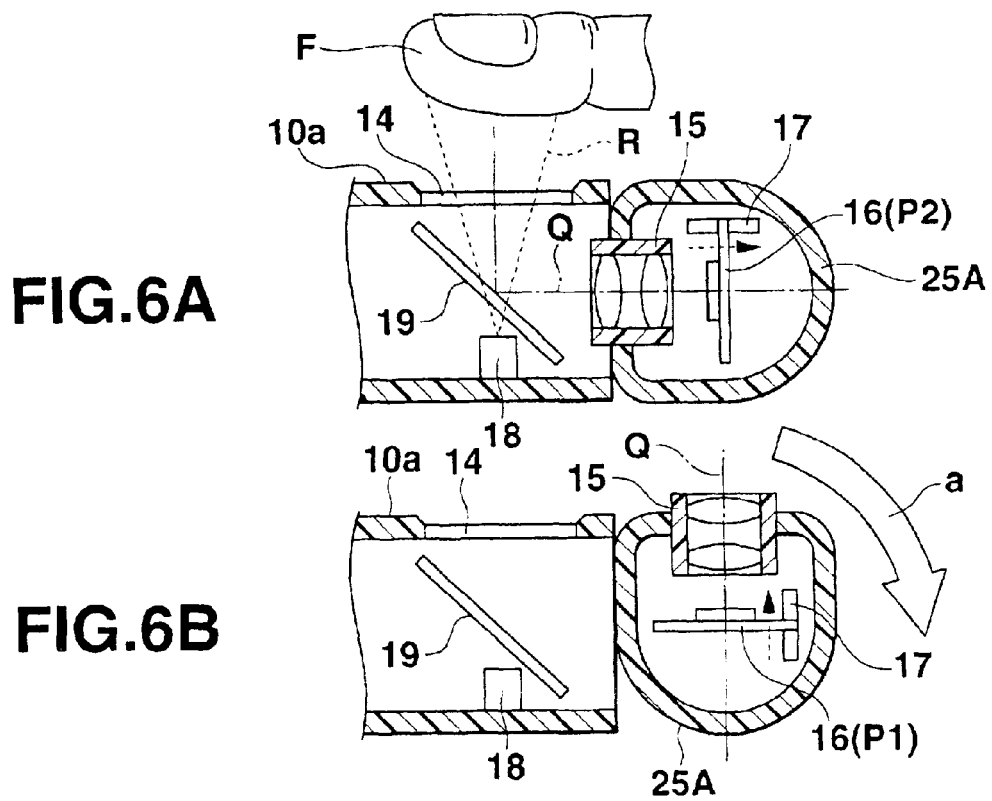
FIG.6A
FIG.6B

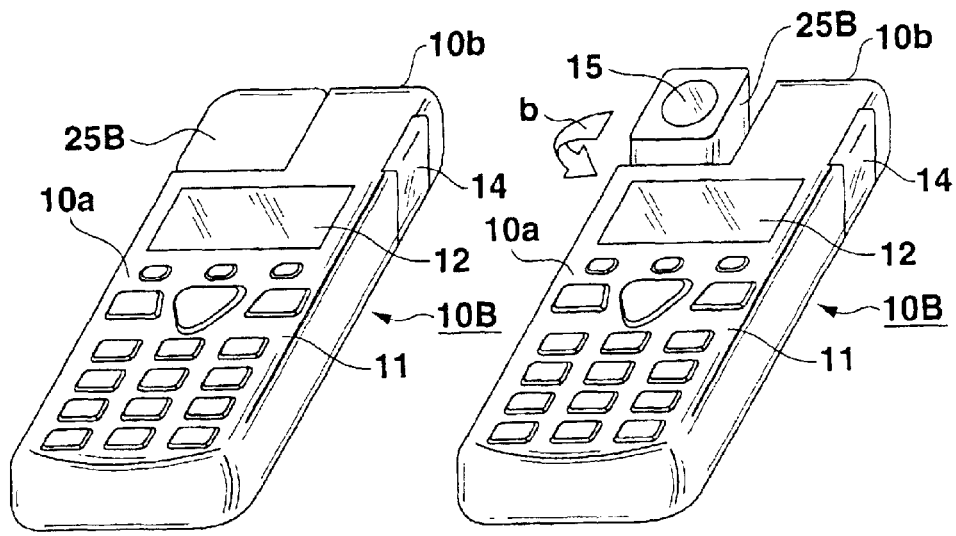
FIG.7A  FIG.7B
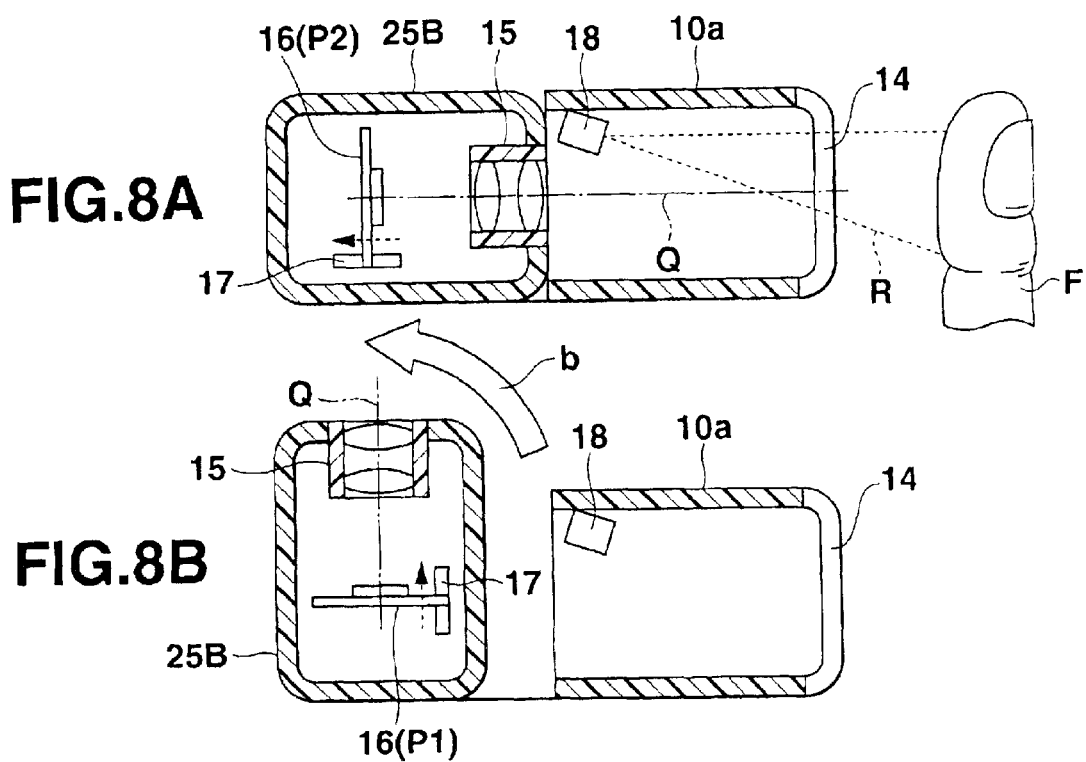
FIG.8A
FIG.8B

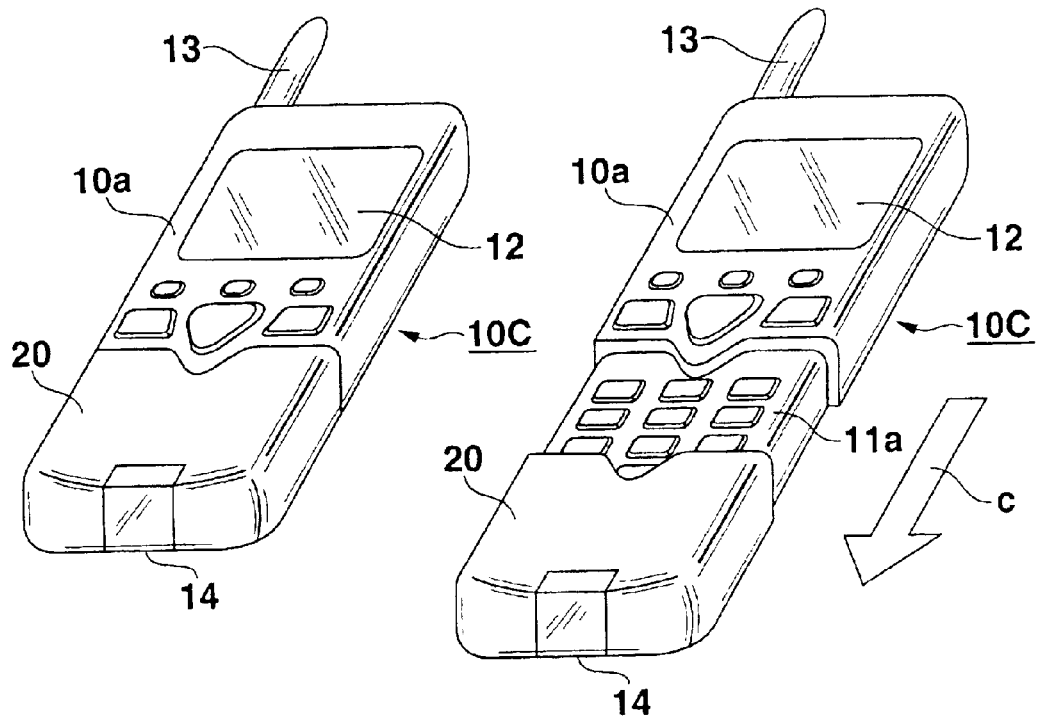
FIG.9A FIG.9B
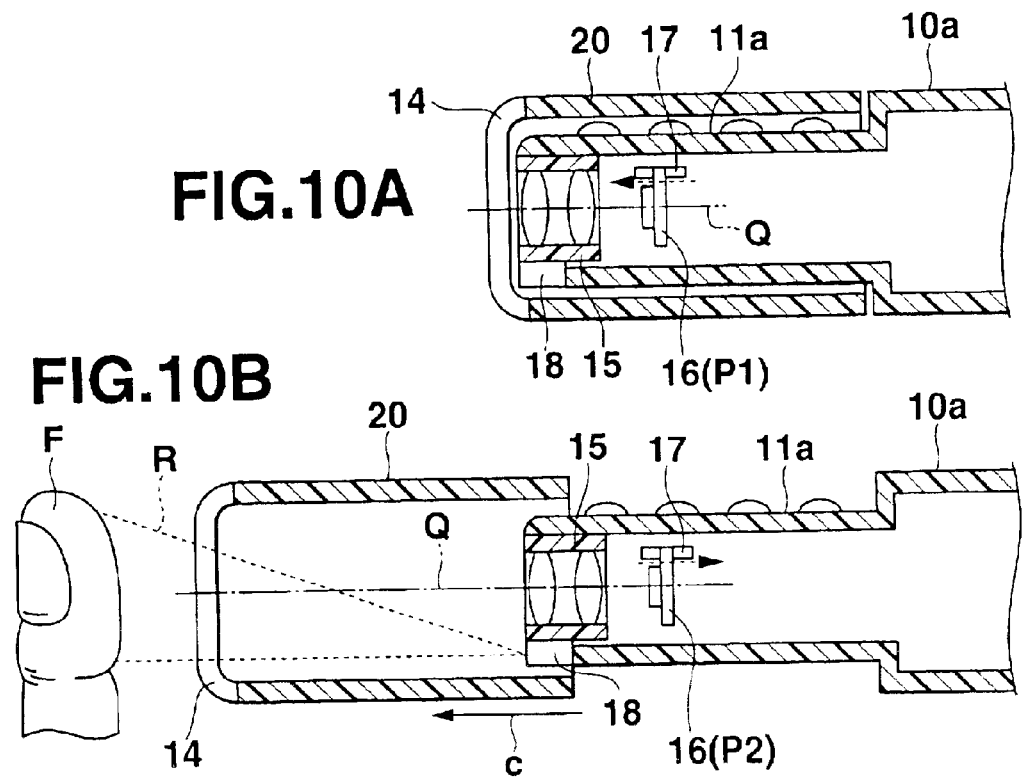
FIG.10A
FIG.10B

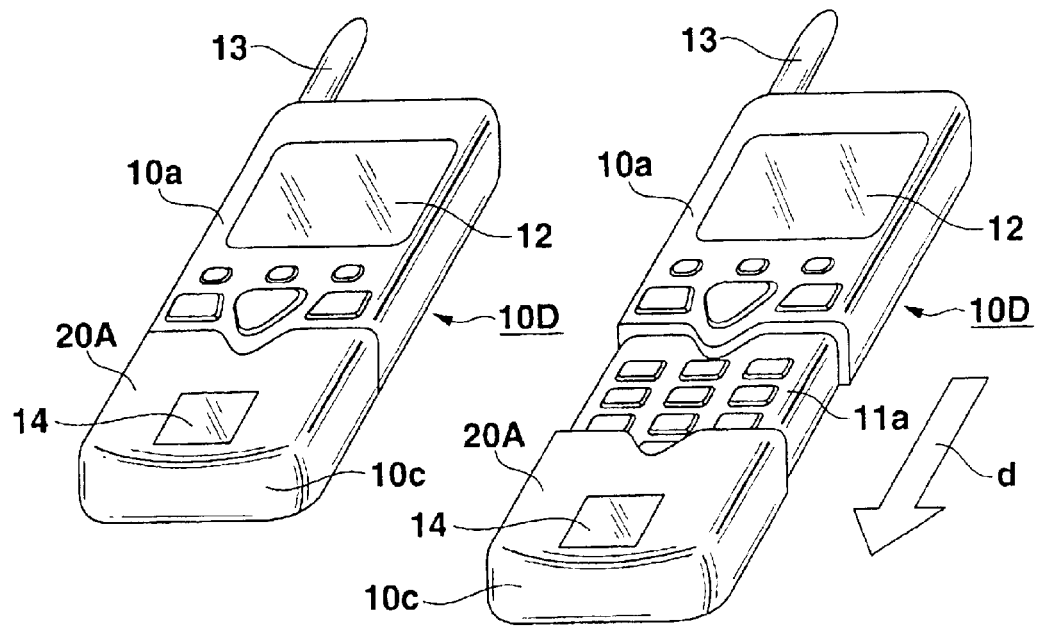
FIG.11A  FIG.11B
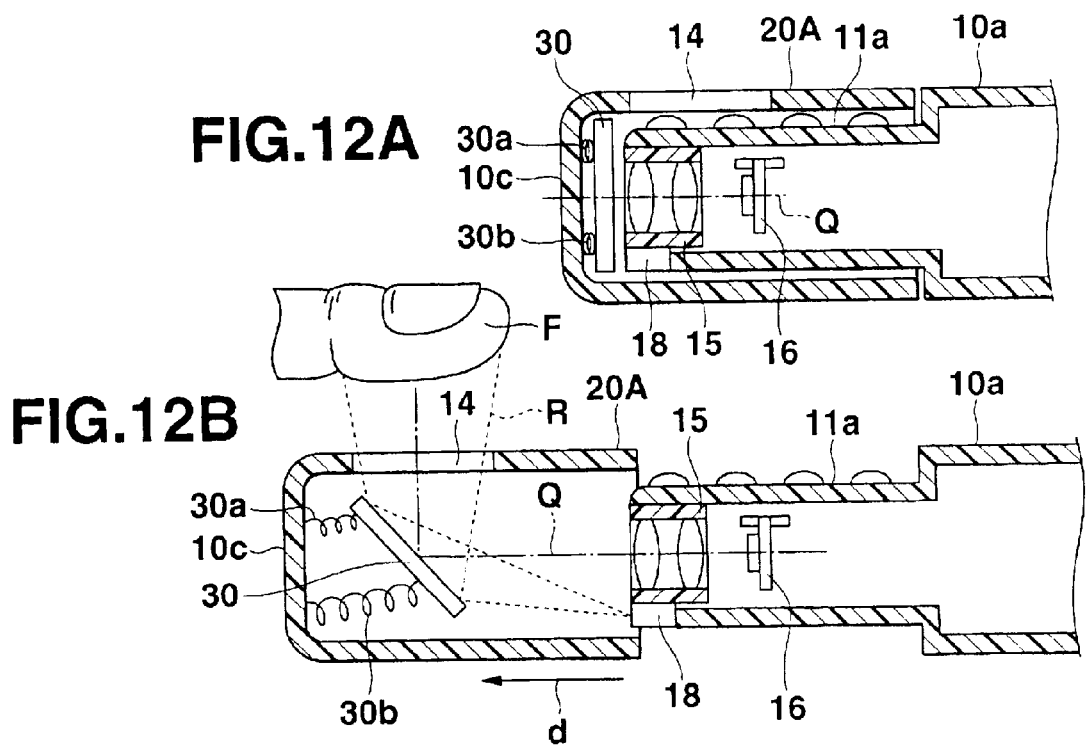
FIG.12A
FIG.12B

123 (SERVER REGISTRATION DATABASE)

| NAME | ID | REGISTERED FINGERPRINT IMAGE | IMAGE SPECIFICATION | EXTERNAL OUTPUT | ENABLE TERMINAL |
|---|---|---|---|---|---|
| AIDA | 0001 | | 8 bit color, 300 × 300dot, 50mpitch | ENABLE | xxx |
| TANAKA | 0002 | | | DISABLE | |
| NAKAMATSU | 0003 | | | DISABLE | |
| MATSUMOTO | | | | | |
| MOTOKI | | | | | |

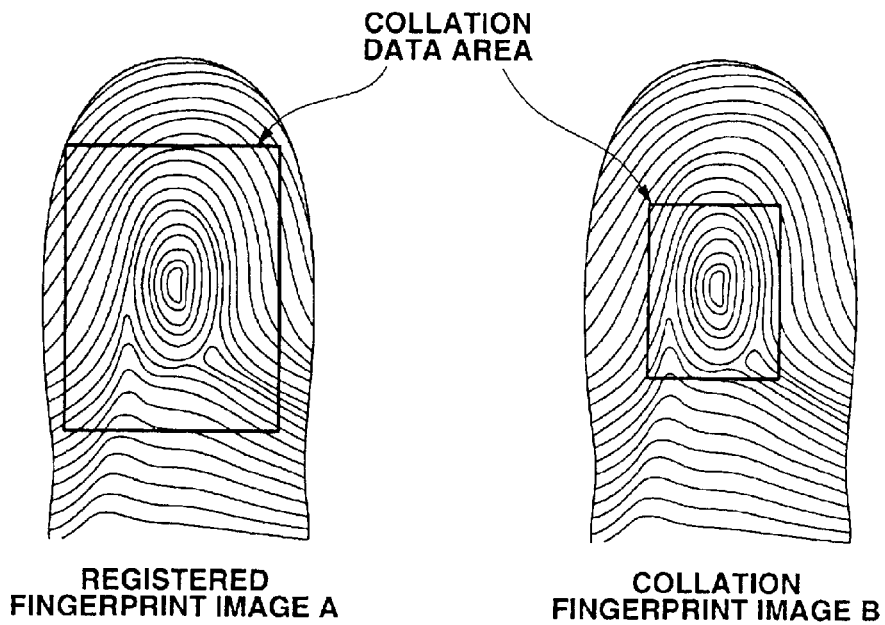
FIG.20
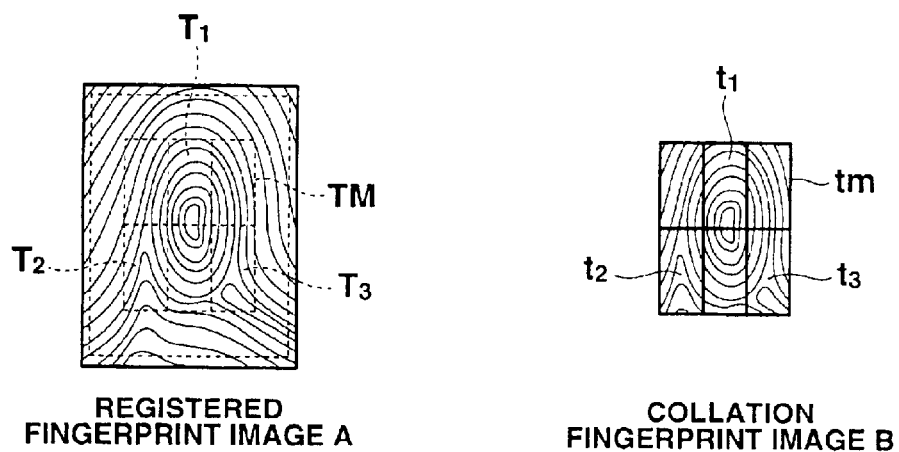
FIG.21
| DATA SIZE | PIXEL PITCH | GRADATION DATA | TOP OR BOTTOM |
|---|---|---|---|
(IMAGE HEADER DATA)
FIG.22

AUTHENTICATION SYSTEM BASED ON FINGERPRINT AND ELECTRONIC DEVICE EMPLOYED FOR THE SYSTEM

CROSS-REFERENCE TO RELATED APPLICATIONS

This application is based upon and claims the benefit of priority from the prior Japanese Patent Applications No. 2000-208911, filed Jul. 10, 2000; and No. 2000-380310, filed Dec. 14, 2000, the entire contents of both of which are incorporated herein by reference.

BACKGROUND OF THE INVENTION

1. Field of the Invention

The present invention relates to an electronic device such as PDA (personal digital assistants) or cellular phone with an image pickup function and an authentication system for carrying out individual authentication based on a fingerprint image read by the electronic device with the image pickup function.

2. Description of the Related Art

In recent years, connection to Internet using a portable electronic device such as PDA or cellular phone and an access to a desired Web site are frequently carried out.

Such access processing over Internet often requires authentication of identity because of a security problem. Authentication of identity due to check a single ID code or personal identification number for coincidence has low reliability, and an identity authentication based on fingerprint is desired.

On the other hand, there is provided a conventional portable terminal device with an image pickup function. For example, the PDA or cellular phone includes a small sized CCD (charge coupled device). However, in such a portable terminal device with an image pickup function, if an attempt is made to pick up a fingerprint image, a plurality of optical systems that differ from each other during ordinary imaging and fingerprint imaging are disposed, and these systems must be used by switching them. The makes it difficult to provide a configuration suitable to miniaturization.

Meantime, in fingerprint authentication, in order to ensure a certain degree of authentication precision, it is required to sample a predetermined number of characteristics graphics (for example, less than 13) from fingerprint data. In any of registered fingerprint data and authentication fingerprint data as well, it is required to sample a fingerprint image in a region close to the substantially entirety of fingers. Thus, it is difficult to apply to a fingerprint authentication system a partial fingerprint image sampled from a portable terminal in which only a small fingerprint reading window can be provided.

BRIEF SUMMARY OF THE INVENTION

It is an object of the present invention to provide a small sized electronic device with an image pickup function.

Another object of the invention is to provide an authentication system based on a partial fingerprint image sampled from an electronic device in which a small fingerprint reading window is provided.

According to one aspect of the present invention, an electronic device comprises an image pickup unit including an image pickup element and a lens system; a focus controller configured to change a distance between the image pickup element and the lens system in accordance with switching between an ordinary imaging mode and a fingerprint imaging mode.

According to anther aspect of the present invention, an electronic device comprises an image pickup unit including an image pickup lens and an image pickup element arranged on an image pickup axis of the image pickup lens, the image pickup unit being rotatably provided at a body of the device so that an imaging direction of the image pickup unit is oriented in an inward direction or an outward direction of the body of the device; an image pickup window provided on a side face of the body of the device such that a fingerprint image of a finger pressed against the image pickup window is incident to the image pickup lens when the imaging direction of the image pickup unit is oriented in the inward direction of the body of the device; and a light source provided inside of the body of the device and configured to emit light outward of the body through the image pickup window, wherein an ordinary imaging mode is set if the imaging direction of the image pickup unit is oriented in the outward direction, and a fingerprint imaging mode is set if the imaging direction of the image pickup unit is oriented in the inward direction.

According to further aspect of the present invention, an electronic device comprises a slide cover mounted so as to cover one end of a body of the device and expose a part of the body of the device if the slide cover is opened; an image pickup lens provided on a side face of the one end of the body of the device; an image pickup element arranged inside of the body of the device and on an image pickup axis of the image pickup lens; an image pickup window provided on a side face of the slide cover on the image pickup axis; and a light source provided on the side face of the one end of the body of the device and configured to emit light outwardly of the slide cover through the image pickup window, wherein an ordinary imaging mode is set if the slide cover covers the one end of the body of the device, and a fingerprint imaging mode is set if the slide cover is opened.

According to still another aspect of the present invention, a fingerprint authentication system comprises a terminal device and a fingerprint authentication device connected to each other via a network, wherein the terminal device comprises a fingerprint reader configured to read a fingerprint image of a user; and a fingerprint transmitter configured to transmit the fingerprint image read by the fingerprint reader to the fingerprint authentication device, and the fingerprint authentication device comprises a memory configured to store a reference fingerprint image; a fingerprint receiver configured to receive the fingerprint image transmitted from the fingerprint transmitter; and a collation section configured to collate the fingerprint image received by the fingerprint receiver with at least part of the reference fingerprint image based on a size of the fingerprint image received by the fingerprint receiver.

According to still further aspect of the present invention, a fingerprint authentication device comprises a memory configured to store a reference fingerprint image; a fingerprint receiver configured to receive a partial fingerprint image transmitted from an external device; a detector configured to detect a plurality of small regions in the reference fingerprint image having a maximum correlation with regard to the fingerprint image received by the fingerprint receiver; and a collation section configured to determine identity between the fingerprint image received by the fingerprint receiver and the reference fingerprint image based on a position relationship of the plurality of small regions.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

FIG. 5A and FIG. 5B are views each showing an external configuration of a portable terminal device according to a second embodiment;

FIG. 6A and FIG. 6B are views each showing a configuration of an image pickup unit of the second embodiment;

FIG. 7A and FIG. 7B are views each showing an external configuration of a portable terminal device according to a third embodiment;

FIG. 8A and FIG. 8B are partial cross section views each showing a configuration of an image pickup unit of the third embodiment;

FIG. 9A and FIG. 9B are an external configuration of a portable terminal device according to a fourth embodiment;

FIG. 10A and FIG. 10B are partial cross section views each showing a configuration of an image pickup unit of the fourth embodiment;

FIG. 11A and FIG. 11B are views each showing an external configuration of a portable terminal device according to a fifth embodiment;

FIG. 12A and FIG. 12B are partial cross section views each showing a configuration of an image pickup unit of the fifth embodiment;

FIG. 20 is a view showing the registered fingerprint image "A" and the object fingerprint image "B" which is formed of partial images of the sixth embodiment;

FIG. 21 is a view illustrating a method of authenticating fingerprints between the registered fingerprint image "A" and the object fingerprint image "B" which is formed of partial images of the sixth embodiment;

FIG. 22 is a view showing header information to be added to fingerprint image data of the sixth embodiment;

DETAILED DESCRIPTION OF THE INVENTION

An embodiment of an electronic device with an image pickup function according to the present invention will now be described with reference to the accompanying drawings.

First Embodiment

Figure 1A:
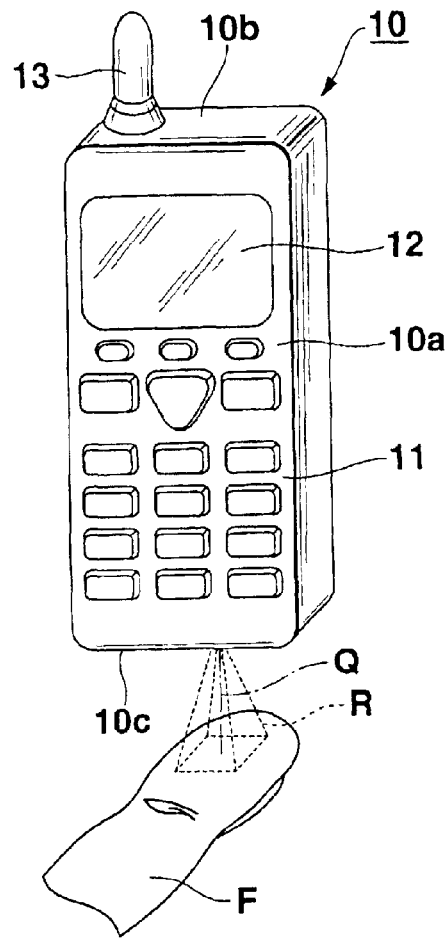
FIG. 1A is a view showing an external configuration of a portable terminal device according to a first embodiment of the present invention.
Figure 1B:
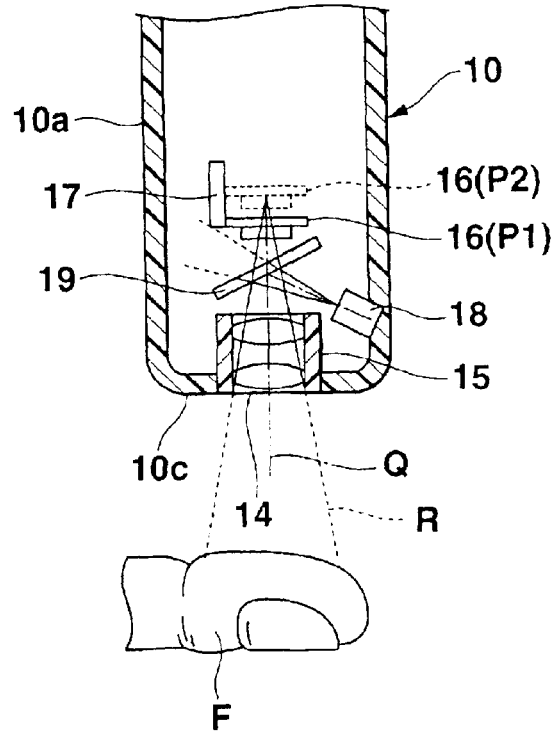
FIG. 1B is a partial cross section view showing a configuration of an image pickup unit of the first embodiment.

FIG. 1A and FIG. 1B show a portable terminal device having a telephone function, where FIG. 1A is a perspective front view showing an external configuration of the portable terminal device, and FIG. 1B is a partial cross section view showing a configuration of an image pickup unit of the terminal device.

At a front face 10a of the portable terminal device main body 10, there are provided a key input unit 11 comprising numeric, character, and symbol input keys; calling/receiving command key; various function keys; a selection/cursor key and the like; and a liquid crystal display unit 12. In addition, at a top face portion 10b of the main body 10, a telephone communication antenna 13 is provided.

An image pickup window 14 is provided at a lower face portion 10c of the main body 10, and an image pickup lens 15 is mounted on the image pickup window 14.

An image pickup element 16 using a CCD is arranged inside of the main body 10 located on an image pickup axis Q via the image pickup lens 15 from the above image pickup window 14. The image pickup element 16 is mounted as a mechanism capable of sliding at two positions between a camera mode position P1 and a fingerprint authentication mode position P2 along the image pickup axis Q by a focus adjustment device 17 using a piezoelectric actuator.

A light source 18 using an LED lit in the fingerprint authentication mode P2 is provided laterally of the image pickup axis Q between the image pickup lens 15 and the image pickup element 16. An emission light R from the light source 18 is emitted in the downward direction of the main body 10 via the image pickup lens 15 and image pickup window 14 by reflection of a half mirror 19 disposed between the image pickup lens 15 and the image pickup element 16, and a fingerprint capture range of a finger F is emitted.

An infinite object is focused if the image pickup element 16 is slid to the camera mode position P1 by means of the focus adjustment device 17, and a proximal object is focused if the element 16 is slid to the fingerprint authentication mode position P2. In fingerprint authentication mode P2, a range at the tip end of finger more than the first articulated joint, for example, can be captured as image data.

Figure 2:
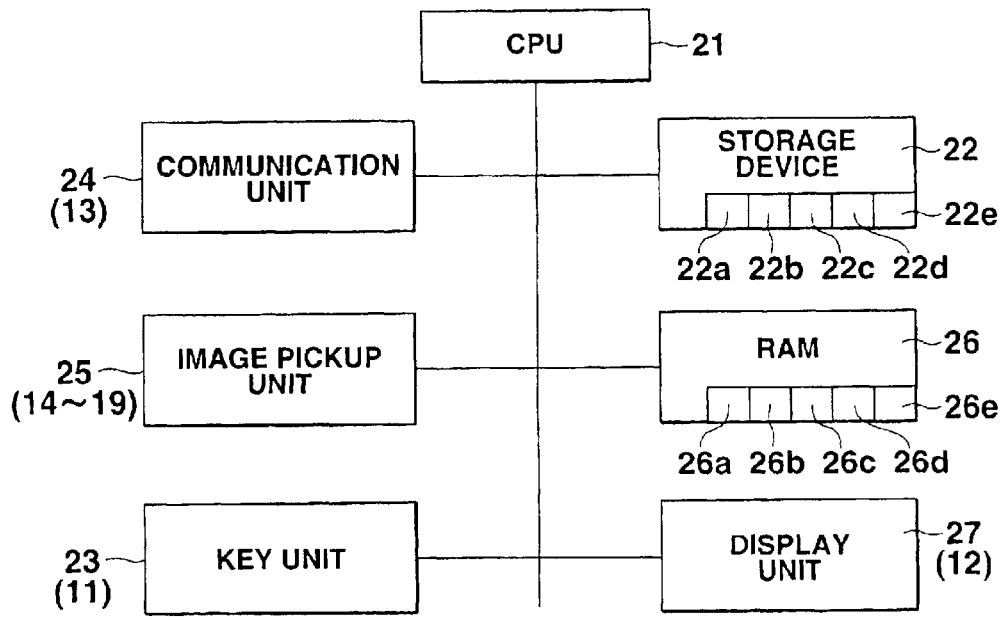
FIG. 2 is a block diagram showing a configuration of an electronic circuit of the first embodiment.

FIG. 2 is a block diagram of an electronic circuit of the portable terminal device.

The portable terminal device comprises a control section (CPU) 21. The CPU 21 controls operation of each circuit section in accordance with a control program stored in advance in a storage device 22 using $E^2PROM$ or the like. The storage device 22 stores control programs including a system program 22*a* that controls operation of the entire device; a communication control program 22*b* for carrying out processing for communication with a telephone base station; and a fingerprint collation program 22*c* for carrying out fingerprint collation processing. In addition, the storage device 22 stores owner's finger image data 22*d* of the terminal device or telephone number data 22*e* of the telephone device.

To the CPU 21, there are connected the storage device 22, a key unit 23 (11 in FIG. 1), a communication unit 24 (13 in FIG. 1) primarily configured of a transmitter/receiver circuit with a telephone base station or a voice input/output circuit; an image pickup unit 25 (14–19 in FIG. 1) for digitally processing and capturing image data picked up by the image pickup element 16; a RAM 26 comprising a variety of work data memories; and a display unit 27 (12 in FIG. 1) comprising a liquid crystal driver circuit or the like for displaying various types of display data.

The RAM 26 includes a mode data memory 26*a* for storing data indicating the camera mode P1 or the fingerprint authentication mode P2 that are currently set; an image pickup position data memory 26*b* for storing data indicating whether a slide position of the image pickup element 16 by a focus adjustment device 17 in the image pickup unit 25 is set at the camera mode position P1 or at the fingerprint authentication mode P2; an object fingerprint image memory 26*c* for storing fingerprint image data targeted to be authenticated, the image data being captured from the image pickup unit 25 in the fingerprint authentication mode P2; a telephone directory data memory 26*d* for properly registering and storing a telephone number or name of an acquaintance or friend; and a work memory 26*e* for temporarily storing and holding various types of data input to or output from the CPU 21 as required in accordance with a variety of control programs stored in the storage device 22.

An operation of switching between the camera mode position P1 and the fingerprint authentication mode position P2 of the image pickup element 16 by the focus adjustment device 17 of the image pickup unit 25 is executed according to an instruction by key operation at the key input section 23.

Now, an operation of the portable terminal device will be described.

Figure 3:
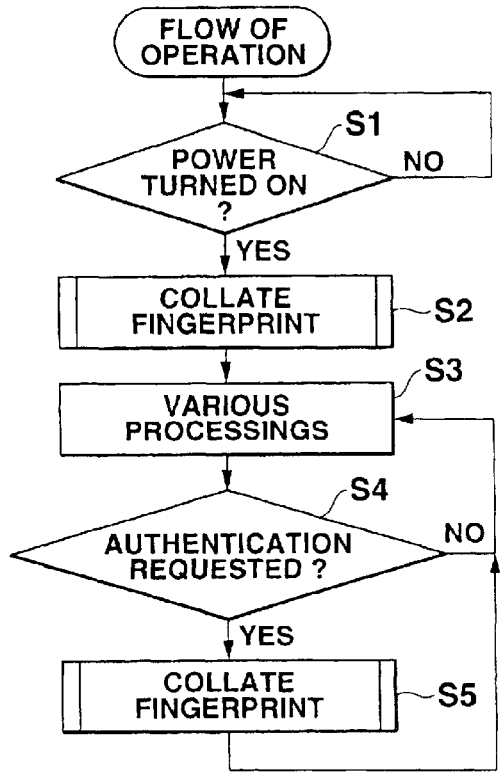
FIG. 3 is a flow chart showing entire processing of the first embodiment.

FIG. 3 is a flow chart showing the entire processing of the portable terminal device.

If power is turned ON by operation of the key input section 23 (step S1), data indicating the fingerprint authentication mode P2 is set to the mode data memory 26*a* in the RAM 26, and the fingerprint collation program 22*c* is initiated at step S2. Then, processing is moved to fingerprint collation processing (refer to FIG. 4) in order to exclude use of an unauthorized person.

Figure 4:
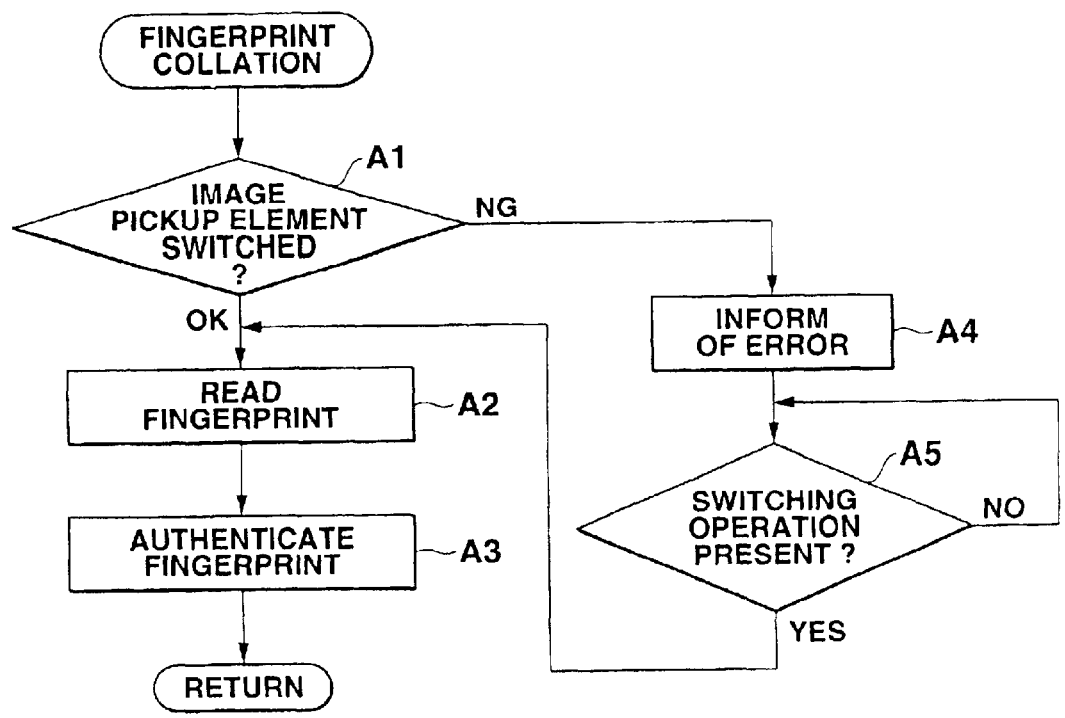
FIG. 4 is a flow chart showing fingerprint collation processing of the first embodiment.

FIG. 4 is a flow chart showing fingerprint collation processing (steps S2 and S5 in FIG. 3) of the portable terminal device.

In the fingerprint collation processing, collation between the registered owner's fingerprint image data 22*d* stored in the storage device 22 and object fingerprint image data captured by the image pickup unit 25 is carried out. In the fingerprint collation processing, data indicating the slide position of the image pickup element 16 stored in the image pickup position data memory 26*b* in the RAM 26 is first read out, and it is determined whether the operation mode is switched to the fingerprint authentication mode P2 (step A1).

If the position of the image pickup element 16 in the image pickup unit 25 is switched to the fingerprint authentication mode position (OK at step A1), a user fingerprint image is read by means of the imaging element 16 via the image pickup lens 15, and is stored in the object fingerprint image memory 26*c* in the RAM 26 (step A2). The image reading is carried out while the user aligns the tip end more than the first articulated joint of a finger F inside of the emission range of the emission light R emitted from the image pickup window 14 at the lower face portion 10*c* of the device main body 10.

The object fingerprint image stored in the object fingerprint image memory 26*c* incorporated in the RAM 26 is subjected to collation/authentication processing with the registered owner's finger image data 22*d* stored in the storage device 22, and the identity of the current user is authenticated (step A3).

On the other hand, the position of the image pickup element 16 is not switched to the fingerprint authentication mode position (NG at step A1), an alarm sound is issued or an error message is displayed, whereby it is notified to the user that switching to the fingerprint authentication mode P2 is not established (step A4).

If the user who has received the notification makes key operation at the key input unit 23 (step A5), whereby the image pickup element 16 is switched from the camera mode position to the fingerprint authentication mode position, processing is shifted to step A2 at which user's fingerprint image reading processing and collation/authentication processing are carried out.

Returning to FIG. 3, if it is authenticated that the user is the owner through such fingerprint collation processing (step S2), an operation of the communication unit 24 is controlled in accordance with the communication control program 22*b*, and a variety of processing functions such as telephone communication processing or processing for access to a desired Web site over Internet can be executed (step S3).

If the access to a certain Web site over Internet is provided, for example, if authentication of an access user due to fingerprint collation has been requested (step S4), processing is shifted to fingerprint collation processing (step S5: refer to FIG. 4). In fingerprint collation processing, the user's fingerprint image registered in the Web site being accessed is transmitted to the portable terminal device, and the image is collated with the captured user's fingerprint.

According to the portable terminal device of the first embodiment, ordinary imaging and fingerprint image pickup can be carried out by the common optical system. Thus, an image pickup device can be incorporated into the electronic device without increasing in size.

Second Embodiment

FIG. 5A and FIG. 5B are views each showing an external configuration of a portable terminal device according to the second embodiment. FIG. 5A shows an authentication mode setting in which the image pickup unit 25A is directed in the inward direction of the main body 10A, and FIG. 5B shows a camera mode setting in which the image pickup unit 25A is directed in a direction facing the front of the main body 10A.

FIG. 6A and FIG. 6B are partial cross section views showing a configuration and an operation of an image pickup unit 25A.

The image pickup unit 25A is provided at the upper end of the main body 10A. The image pickup unit 25A can be switched by being vertically rotated at 90 degrees. If the image pickup unit 25A of FIG. 5A is rotated as indicated by the arrow "a", the camera mode setting is realized as shown in FIG. 5B.

The image pickup lens 15 is provided at the image pickup unit 25A, and the image pickup element 16 is arranged inside of the unit 25A on the image pickup axis Q.

The image pickup element 16 is mounted as a mechanism to slide using a piezoelectric actuator at two positions between the camera mode position (infinite imaging position) P1 and the fingerprint authentication mode position (proximal imaging position) P2 according to a setting of the focus adjustment device 17.

At a position adjacent to the image pickup unit 25A at the upper end inside of the main body 10A, while the image pickup direction of the image pickup unit 25A is switched to the inward direction (fingerprint imaging direction) of the main body 10A, there is provided a half mirror 19 for reflecting its image pickup axis Q and guiding it in the direction of the image pickup window (transparent plate) 14 of the front face 10a of the main body 10A.

The light source 18 driven to be lit if the image pickup unit 25A is switched to the fingerprint imaging mode is provided at the interior wall at the rear face of the main body 1A that corresponds to a position at which the image pickup window 14 is arranged. The emission light R from the light source 18 transmits the half mirror 19, is irradiated to the outside from the image pickup window 14, and emits a fingerprint face of the finger F pressed against the image pickup window 14.

During fingerprint authentication mode P2, as shown in FIG. 5A and FIG. 6A, the image pickup direction of the image pickup unit 25A is switched into the inward direction of the main body 10A, and a proximal object is focused. Then, the fingerprint of the finger F pressed against the image pickup window 14 is illuminated by the emission light R from the light source 18, and is picked up as an image by means of the image pickup element 16 via the half mirror 19 and image pickup lens 15.

During the camera mode P1, as shown in FIG. 5B and FIG. 6B, the image pickup unit 25A is switched into the ordinary imaging direction, and an infinite object is focused. Then, an image such as landscape in the same direction is picked up from the image pickup lens 15, and is picked up by the image pickup element 16.

A configuration of an electronic circuit of the portable terminal device in the second embodiment and an operation of the electronic circuit are substantially similar to the portable terminal device in the first embodiment shown in FIG. 2 to FIG. 4. A description of the above circuit will be omitted here.

Third Embodiment

FIG. 7A and FIG. 7B are views showing an external configuration of a portable terminal device according to the third embodiment. FIG. 8A and FIG. 8B are partial cross section views showing a configuration and an operation of an image pickup unit 25B of the portable terminal device according to the third embodiment.

The upper end left half of a main body 10B is configured as an image pickup unit 25B. FIG. 7A shows an authentication mode setting in which the image pickup unit 25B is directed in the inward direction of the main body 10B, and FIG. 7B shows a camera mode setting in which the image pickup unit 25B is directed in a direction facing the front of the main body 10B.

FIG. 8A and FIG. 8B are partial cross section views showing a configuration and an operation of an image pickup unit 25B.

The image pickup unit 25B can be switched by being rotated horizontally by 90 degrees. If the image pickup unit 25B of FIG. 7A is rotated as indicated by the arrow "b", the camera mode setting is realized as shown in FIG. 7B.

At the image pickup unit 25B, as in the second embodiment, there are arranged the image pickup lens 15, image pickup element 16, and focus adjustment device 17 using a piezoelectric actuator.

The image pickup window (transparent plate) 14 is provided on the side face of the upper end right half of the main body 10B. Further, the light source 18 is provided on the interior wall of the upper end right half of the main body 10B at which the image pickup window 14 is arranged, and the emission light R from the light source 18 is irradiated to the image pickup window 14, and emits a fingerprint face of the finger F pressed against the image pickup window 14.

That is, during the fingerprint authentication mode P2, as shown in FIG. 7A and FIG. 8A, the image pickup direction of the image pickup unit 25B is switched to the fingerprint imaging direction oriented inward of the main body 10B, and a proximal object is focused. Then, the fingerprint of the finger F pressed against the image pickup window 14 is irradiated by the emission light R from the light source 18, and is picked up by the image pickup element 16 via the image pickup lens 15.

In addition, if the operation mode is switched to the camera mode, as shown in FIG. 7B and FIG. 8B, the image pickup direction of the image pickup unit 25B is switched to the ordinary imaging direction P1, and an infinite object is focused. Then, an object in the same direction is picked up by the image pickup element 16 through the image pickup lens 15.

A configuration of an electronic circuit of the portable terminal device in the third embodiment and an operation of the electronic circuit are substantially similar to the portable terminal device in the first embodiment. A description of the electronic circuit will be omitted here.

Fourth Embodiment

FIG. 9A and FIG. 9B are views each showing an external configuration of a portable terminal device according to the fourth embodiment FIG. 10A and FIG. 10B are partial cross section views showing an configuration and an operation of an image pickup unit.

In the portable terminal device according to the fourth embodiment, a key input unit 11a of a device main body 10C is covered with a protect cover 20 capable of sliding in a direction indicated by an arrow "c", and the image pickup window 14 made of a transparent plate is provided at the lower end of the protect cover 20.

The image pickup lens 15 is mounted at the lower end of the key input unit 11a covered with the protect cover 20, and the image pickup element 16 is arranged on the image pickup axis Q inside of the main body 10C.

The image pickup element 16 is slid by using a piezoelectric actuator to two focusing mode; one is a camera mode P1 in which the infinite object is focused and a fingerprint authentication mode P2 in which a proximal object is focused according to a state of the protect cover 20. If the cover 20 closes as shown in FIG. 9A and FIG. 10A, the camera mode P1 is set and if the cover 20 opens as shown in FIG. 9B and FIG. 10B, the fingerprint authentication mode P2 is set.

The light source 18 is provided at a position adjacent to the image pickup lens 15 at the lower end of the key input unit 11a. The light source 18 is driven to be lit if the protect cover 20 is slid, and the key input unit 11a is opened. The emission light R from the light source 18 is irradiated to the image pickup window 14, and emits a fingerprint face of the finger F pressed against the image pickup window 14.

During the camera mode P1, as shown in FIG. 9A and FIG. 10A, the protect cover 20 is closed to be at the ordinary imaging position, and an infinite object is focused. Then, an object located in a direction facing the image pickup window 14 is picked up by the image pickup element 16 via the image pickup window 14 and image pickup lens 15.

If the operation mode is switched to the fingerprint authentication mode P2, as shown in FIG. 9B and FIG. 10B, the protect cover 20 is opened to be switched to the fingerprint imaging position, and a proximal object is focused. Then, the fingerprint of the finger F pressed against the image pickup window 14 is illuminated by the emission light R from the light source 18, and is picked up as an image by means of the image pickup element 16 via the image pickup lens 15.

A configuration of an electronic circuit of the portable terminal device in the fourth embodiment and an operation of the electronic circuit is substantially similar to the portable terminal device in the first embodiment shown in FIG. 2 to FIG. 4. A description of the electronic circuit will be omitted here.

Fifth Embodiment

FIG. 11A and FIG. 11B are views showing an external configuration of a portable terminal device according to the fifth embodiment. FIG. 12A and FIG. 12B are partial cross section views showing a configuration and an operation of an image pickup unit.

The key input unit 11a of a device main body 10D is covered with the protect cover 20A capable of sliding in a direction indicated by an arrow "d", and the image pickup window 14 made of a transparent plate is provided at the front lower part of the protect cover 20A.

The image pickup lens 15 is mounted at the lower end of the key input unit 11a covered with the protect cover 20A, and the image pickup element 16 is arranged on the image pickup axis Q inside of the main body 10D. The light source 18 is provided at a position adjacent to the image pickup lens 15 at the lower end of the key input unit 11a.

Inside of the protect cover 20A, a mirror 30 is mounted on a bottom face opposite to the image pickup lens 15 by means of support springs 30a and 30b.

The light source 18 is driven to be lit if the protect cover 20A is slid, and the key input unit 11a is released. The emission light R from the light source 18 is irradiated to the image pickup window 14 by being reflected by 90 degrees by the mirror 30 mounted on the bottom face of the protect cover 20A, and emits the fingerprint face of the finger F pressed against the image pickup window 14.

That is, as shown in FIGS. 11A and 12A, if the protect cover 20A is closed, the mirror 30 is pressed in contact with the lower end portion of the key input unit 11a to be received in the space with the protect cover 20A.

If the operation mode is switched to the fingerprint authentication mode P2, as shown in FIG. 11B and FIG. 12B, the protect cover 20 is opened. Then, the fingerprint of the finger F pressed against the image pickup window 14 is illuminated by the emission light R from the light source 18 reflected by the mirror 30, and is picked up as an image by the image pickup element 16 via the mirror 30 and image pickup lens 15.

The mirror 30 may be disposed at a predetermined position by employing a link mechanism interlocked with movement of the protect cover 20A instead of the support springs 30a and 30b.

In each of the foregoing embodiments, although the image pickup window (transparent plate) 14 being the fingerprint image reading face against which the fingerprint face of the finger F has been pressed is configured with its surface being flat, an image pickup window (transparent plate) with both of the front and rear surfaces being formed on a recessed curve may be used.

Fingerprint Authentication System

Now, a fingerprint authentication system employing a fingerprint image read by the above portable information terminal will be described below.

Figure 13:
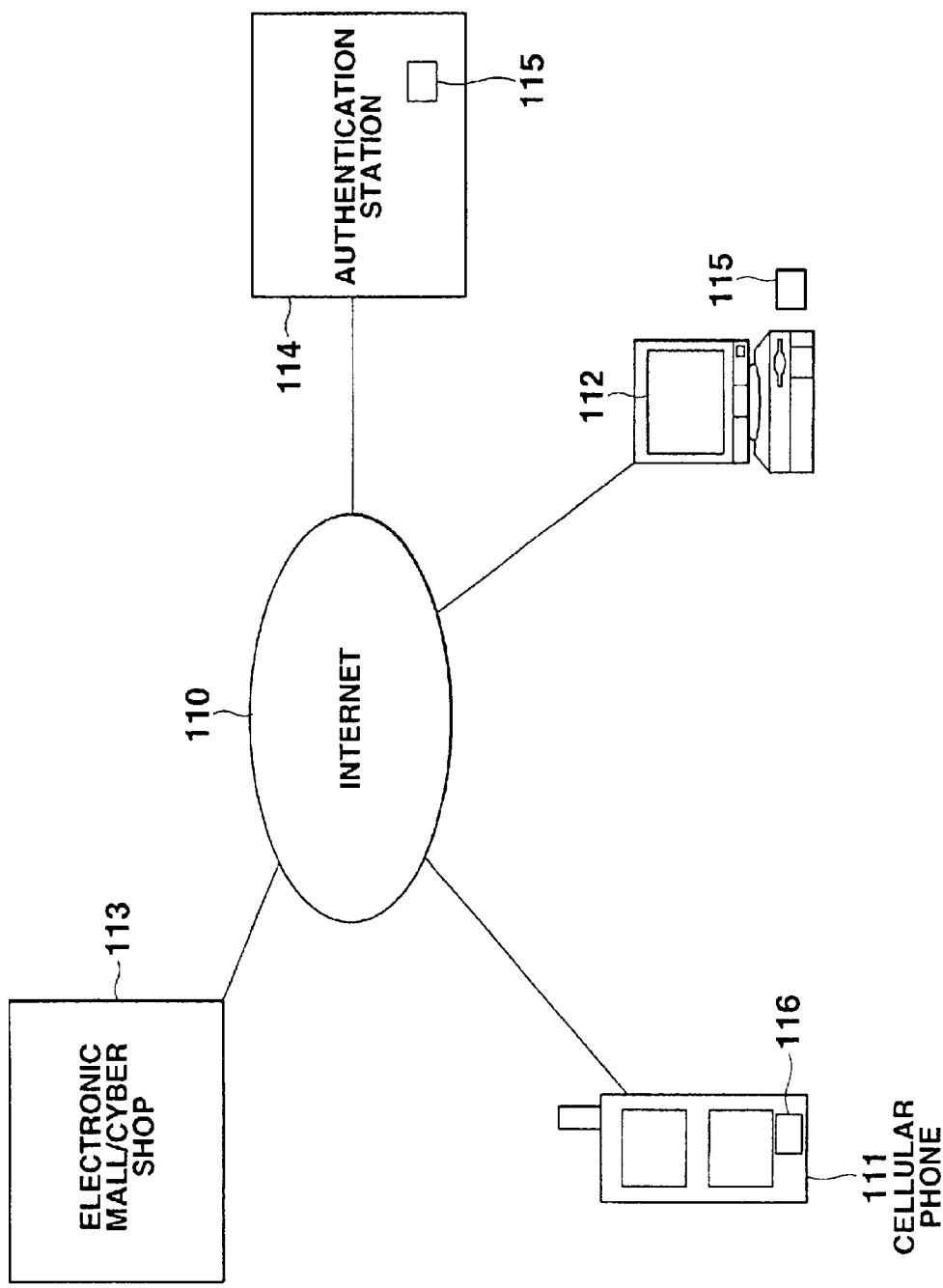
FIG. 13 is a view showing a configuration of a network system comprising a fingerprint authentication apparatus and a fingerprint authentication system according to a sixth embodiment of the present invention.

FIG. 13 is a view showing a network system for achieving a fingerprint authentication system.

A computer device used at various work types or places such as electronic mall/cyber shop 113 is connected to Internet 110 that is an inter-communication network of the network system as well as a number of individual cellular phones 111 or personal computer 112, and further, an authentication station device 114 is connected to Internet 110.

The authentication station device 114 provides individual authentication service to individual users who access Internet 110 by fingerprint authentication. In the authentication station device 114, a multiple gradation image of each of the registered user's fingerprints is registered.

The authentication station device 114 and personal computer 112 comprise a fingerprint reading device 115 capable of reading the entire fingerprint, and the cellular phone 111 comprises a small sized fingerprint reading device 116 capable of reading a partial image of the fingerprint. In order to register individual fingerprints of a user in the authentication station device 114, the user goes to the authentication station device 114 at which such registration is carried out by employing the fingerprint reading device or via a network employing a fingerprint reading device at the cellular phone 111 or personal computer 112. On the other hand, in the case where individual authentication (fingerprint authentication) is carried out at the authentication station device 114, image data read by the fingerprint reading device provided at the cellular phone 111 or personal computer 112 is transmitted to the authentication station device 114, and the transmitted image is collated with a registered fingerprint image.

In the cellular phone 111, when a fingerprint image is registered from the small sized fingerprint reading device 116 into the authentication station device 114, partial images obtained by a plurality of fingerprint reading operations relevant to one fingerprint are combined with each other. The combined images are normalized as the substantially entire fingerprint image, and the normalized images are registered (refer to FIG. 16 and FIG. 17). During fingerprint authentication from the small sized fingerprint reading device 116 in the cellular phone 111 with reference to the registered fingerprint image registered as the entire image of this fingerprint, a fingerprint image obtained by one reading operation is used as an object fingerprint image.

Figures 14, 15:
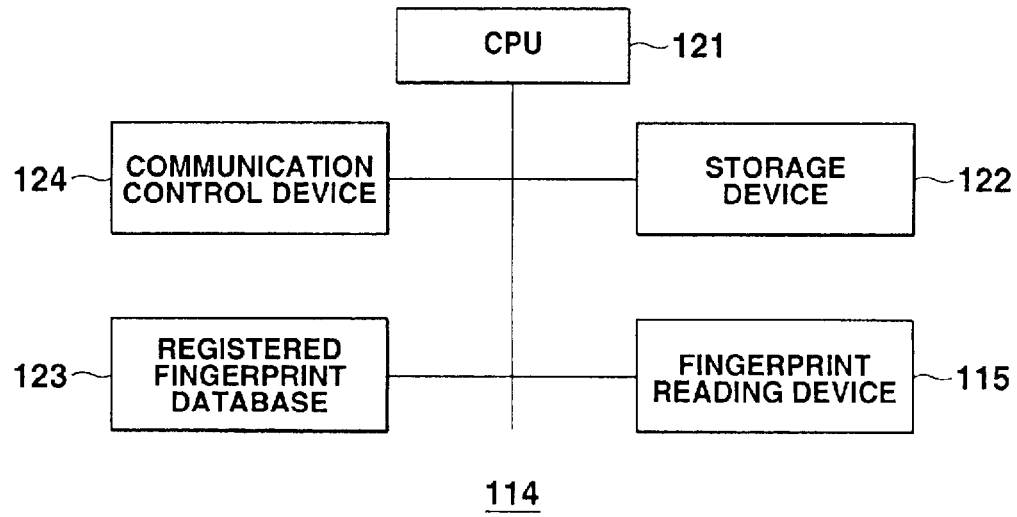
FIG. 14 is a block diagram showing a configuration of an authentication station device of the sixth embodiment.
FIG. 15 is a view showing registered user data in a registered fingerprint database device of the authentication station device of the sixth embodiment.

FIG. 14 is a block diagram showing a configuration of the authentication station device 114. A computer device that is the authentication station device 114 comprises a control section (CPU) 121, and executes fingerprint registration processing or authentication processing and the like in accordance with a control program stored in a storage device 112 that includes a hard disk unit or a semiconductor memory. To the CPU 121, there are connected a fingerprint reading device 115; registered fingerprint database device 123; and communication control device 124 that makes connection with Internet 110 as well as the storage device 122.

FIG. 15 is a view showing registered user data in the registered fingerprint database device 123.

The registered fingerprint database device 123 stores and registers registered user data including a user name, ID code, registered fingerprint image, image specification (data size, pixel pitch, and gradation level), external output enable/disable data indicating enabling or disabling of an external output of the registered user data, and enable terminal data indicating an enable terminal address if an external output is enabled. These items of data are associated with each other for each of the registered users.

The user ID is individually assigned to each of the individuals during registration.

Figure 16:
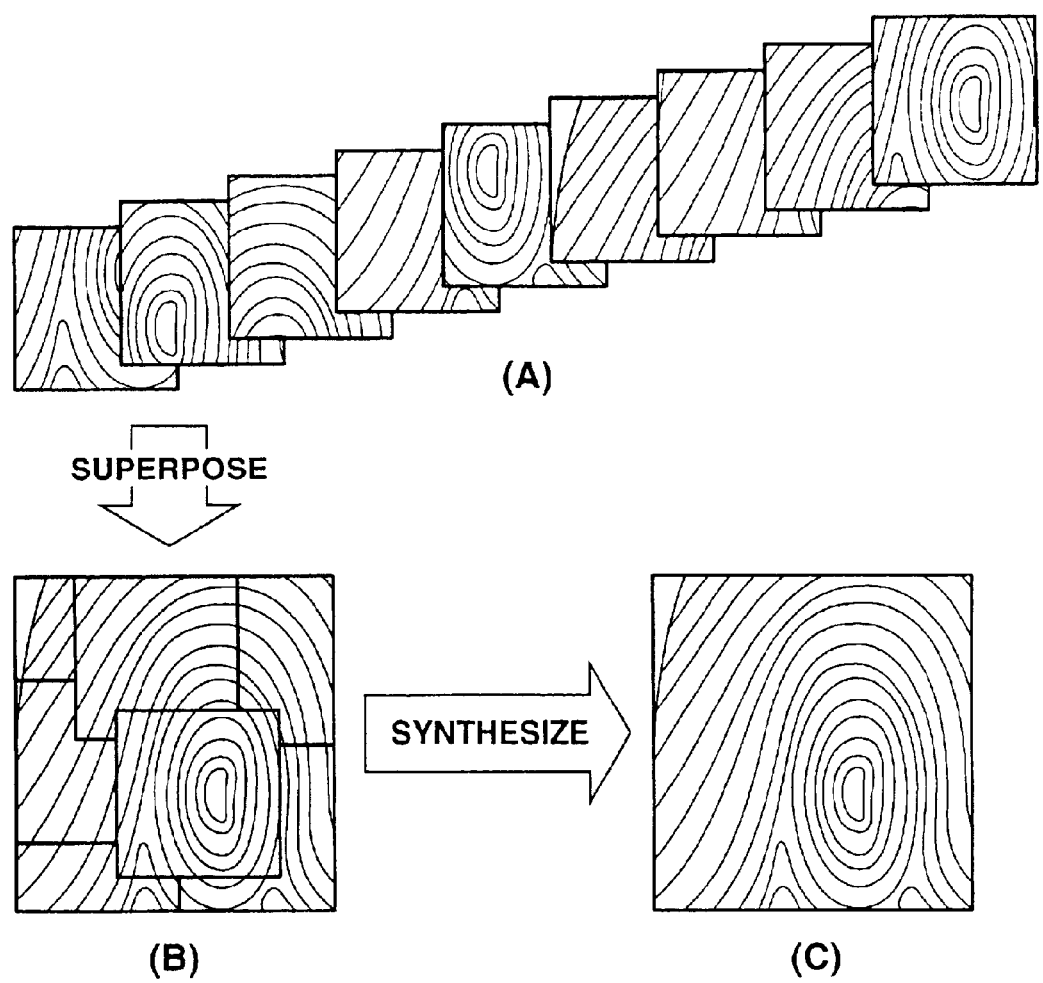
FIG. 16 is a view showing a combination of partial fingerprint images in fingerprint registration of the authentication station device of the sixth embodiment.

If a fingerprint image is registered from the cellular phone 111 to the authentication station device 114, a plurality of fingerprint readings are carried out by means of a small sized fingerprint reading device 116. Then, image data is obtained as shown in FIG. 16. These items of image data as shown in (A) are superimposed at the authentication station device 114 by each image being subjected to processing such as matching, moving, or rotation, as shown in (B), and finally, fingerprint images are registered to be combined with each other, as shown in (C).

Figure 17:
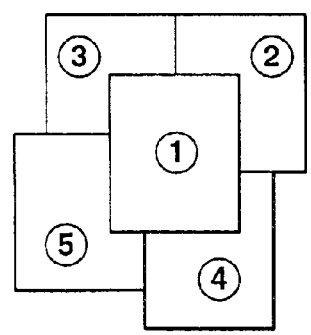
FIG. 17 is a view showing an example of an image pickup and superimposition pattern of partial fingerprint images in fingerprint registration of the authentication station device of the sixth embodiment.

The order of partial reading of fingerprints by the small sized fingerprint reading device 116 is displayed by a guidance message on fingerprint input requirements being assigned from the authentication station device 114 to the cellular phone 111. By user operation in accordance with the guidance message, as shown in FIG. 17, a first fingerprint center part, a second part, a third part, a fourth part, a fifth part, and its peripheral part are read sequentially, and these parts are sent to the authentication station device 114.

Now, a fingerprint authentication method will be described here.

First, a case in which the entire fingerprint image is read from the fingerprint reading device 115 of the personal computer 112 will be described with reference to FIG. 18 and FIG. 19.

Figure 18:
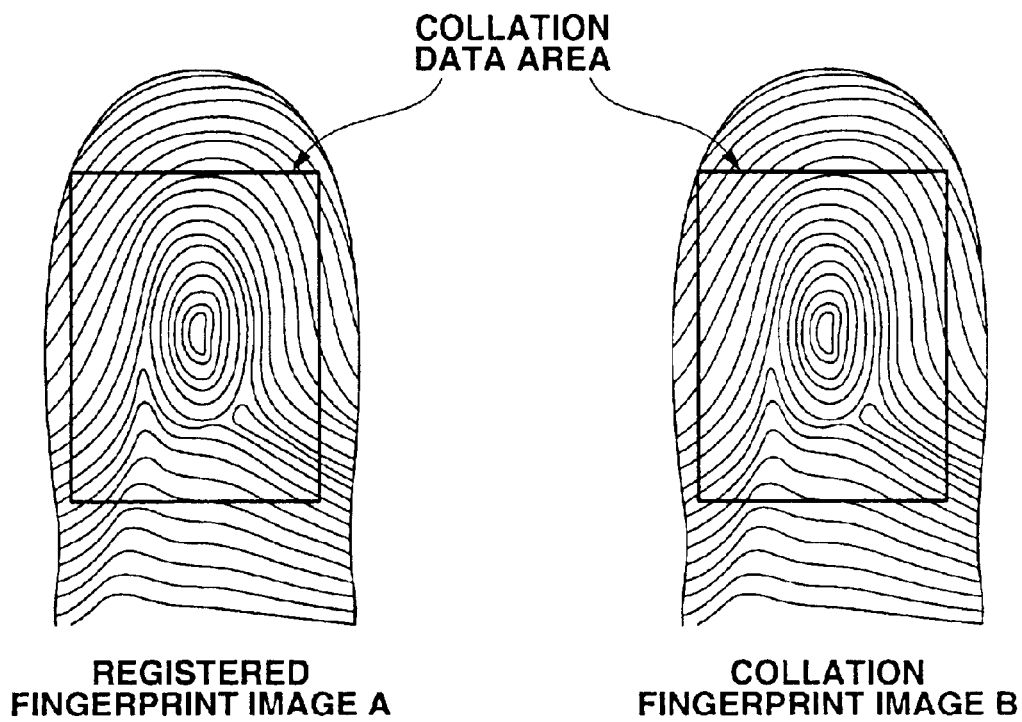
FIG. 18 is a view showing an object fingerprint image "B" identical to a registered fingerprint image "A" in size of the sixth embodiment.
Figure 19:
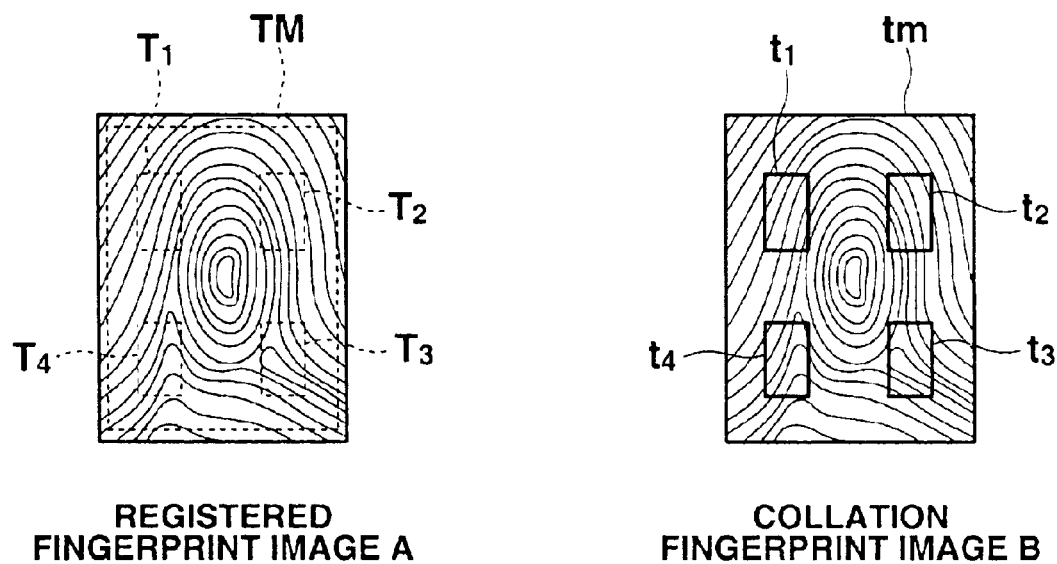
FIG. 19 is a view illustrating a method of authenticating fingerprints between the registered fingerprint image "A" and the object fingerprint image "B" identical to the image "A" in size of the sixth embodiment.

As shown in FIG. 18, when the entire fingerprint is obtained as a registered fingerprint image "A" and an object fingerprint image "B", a main template "tm" and four sub-templates $t_1$ to $t_4$ whose reference is the main template $t_m$ are first disposed in an authentication data area based on a predetermined position relationship. Next, the respective image data corresponding to these templates $t_m$ and $t_1$ to $t_4$ and regions $T_M$ and $T_1$ to $T_4$ each having a maximum correlation are detected on the registered fingerprint image "A". Then, the identity of the object fingerprint is determined according to whether a relative position relationship between each of the sub-template $t_1$ to $t_4$ and the main template $t_m$ coincides with a relative position relationship between each of $T_1$ to $T_4$ and $T_M$.

Now, a fingerprint authentication method when a partial image of a fingerprint is read by means of the small sized fingerprint reading device 116 of the cellular phone 111, will be described with reference to FIG. 20 and FIG. 21.

The authentication station 115 stores in memory the entire image of a fingerprint as a registered fingerprint image "A". A fingerprint image read by means of the small sized fingerprint reading device 116 of the cellular phone 111 is obtained as a portion indicated in a rectangular region on the object fingerprint image "B" shown in FIG. 20. In this case, the main template $t_m$ covering the entirety and three sub-templates $t_1$ to $t_3$ in the main template $t_m$ are disposed relevant to an object fingerprint image being a partial image, as shown in FIG. 21. Image data on a respective one of these templates $t_m$ and $t_1$ to $t_3$ and regions $T_M$ and $T_1$ to $T_3$ each having a maximum correlation are detected on the registered fingerprint image "A". Then, the identity of the object fingerprint is determined according to whether a relative position relationship between each of the sub-template $t_1$ to $t_4$ and the main template $t_m$ coincides with a relative position relationship between each of $T_1$ to $T_4$ and $T_M$.

As an image authentication method utilizing the correlation, there is preferably employed a method disclosed in the U.S. patent application Ser. No. 09/468,633 assigned to the same assignee.

In this way, in a fingerprint authentication method employed in the present invention, the existence of finger characteristics (such as end point or branch point) is not required. Thus, the size of an image region to be collated can be obtained as a small region to an extent such that apexes and bottoms of some fingerprints are included. Therefore, even if the object fingerprint image "B" that is a partial image is collated with a registered fingerprint image "A" that is an entire image, a plurality of template regions $t_m$ and $t_1$ to $t_3$ are set according to the image size of the object fingerprint image "B", thereby enabling fingerprint authentication with its high precision.

The shape, size, and disposition of an available template can be arbitrarily set without being limited to the above example. In the foregoing description, although different templates are employed according to a case in which an object fingerprint image is directed to an entire fingerprint image (FIG. 19) or a partial fingerprint image (FIG. 21), there is no problem even if the template shown in FIG. 21 is employed for authentication of the object fingerprint image shown in FIG. 19.

FIG. 22 is a view showing header information on fingerprint image data read and transferred by the fingerprint reading device 115 or 116 at each terminal on the network system.

As the header information on the fingerprint image data, there are described data size, pixel size, gradation data, and classification of front or rear (discrimination of whether the shape of a trace obtained if a finger is pressed against a reading face is seen from the front or rear).

Then, in the object fingerprint image "B" to be read by the fingerprint reading device 115 or 116 of each terminal, sent to the fingerprint registration/authentication station device 114, and fingerprint authenticated, based on the header information as shown in FIG. 22, the data size, pixel pitch, and gradation level are collated to be standardized in accordance with image specification for the registered fingerprint image "A" indicated in the registered data size of the inside of the registered fingerprint database device 123.

Now, an operation for registering a fingerprint image in the authentication station device 114 in the above mentioned network system will be described.

Figure 23:
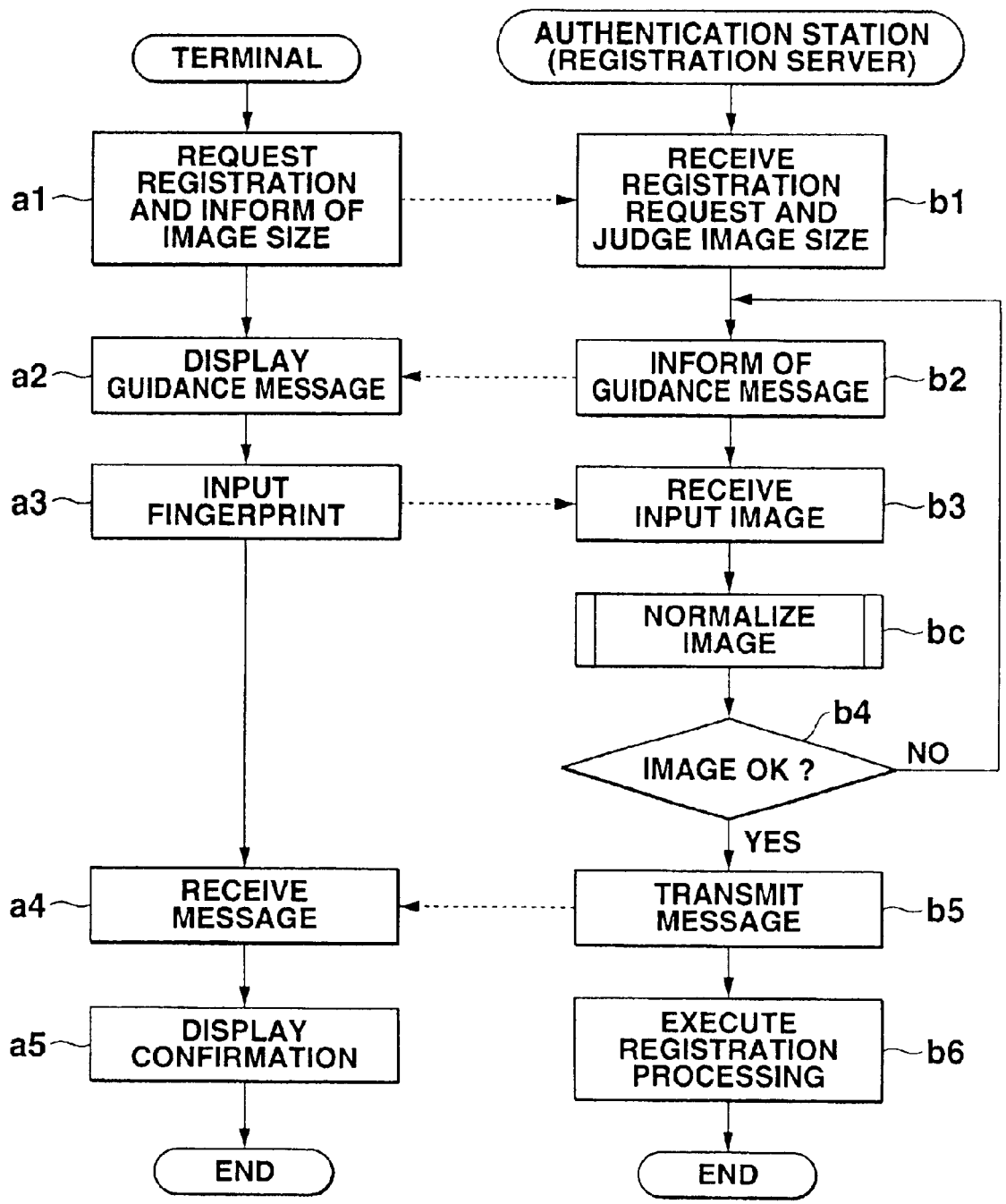
FIG. 23 is a flow chart showing terminal processing and authentication station processing to be associated with each other in fingerprint registration of the sixth embodiment.

FIG. 23 is a flow chart showing terminal processing and authentication processing to be associated with each other in the fingerprint registration in the network system.

Readable image sizes of the fingerprint reading devices 115 or 116 provided at each terminal together with a request for fingerprint registration are notified from cellular phone 111 and personal computer 112 accessed to a registration side of the authentication station device 114 via Internet 110 (step a1). In the authentication station device 114, a request for fingerprint registration from the terminal is received, and a readable fingerprint image size in the registration request terminal is judged (step b1).

Then, a guidance message indicating requirements for fingerprint input according to the readable fingerprint image size at the terminal is notified from the authentication station device 114 to the registration request terminal (step b2), and is displayed at the terminal display section (step a2).

If the registration request terminal is the cellular phone 111 comprising the small sized fingerprint reading device 116, an input requirement guidance message for the user to sequentially input the first fingerprint center part, the second part, the third part, . . . and its peripheral part, as shown in FIG. 17, is notified stepwise from the authentication station device 114, and is displayed.

If the registration request terminal is the personal computer 112 comprising the fingerprint reading device 115, an input requirement guidance message for the user to input the substantially entire fingerprint to the fingerprint reading device 115 one time is notified from the authentication station device 114, and is displayed.

Figure 24:
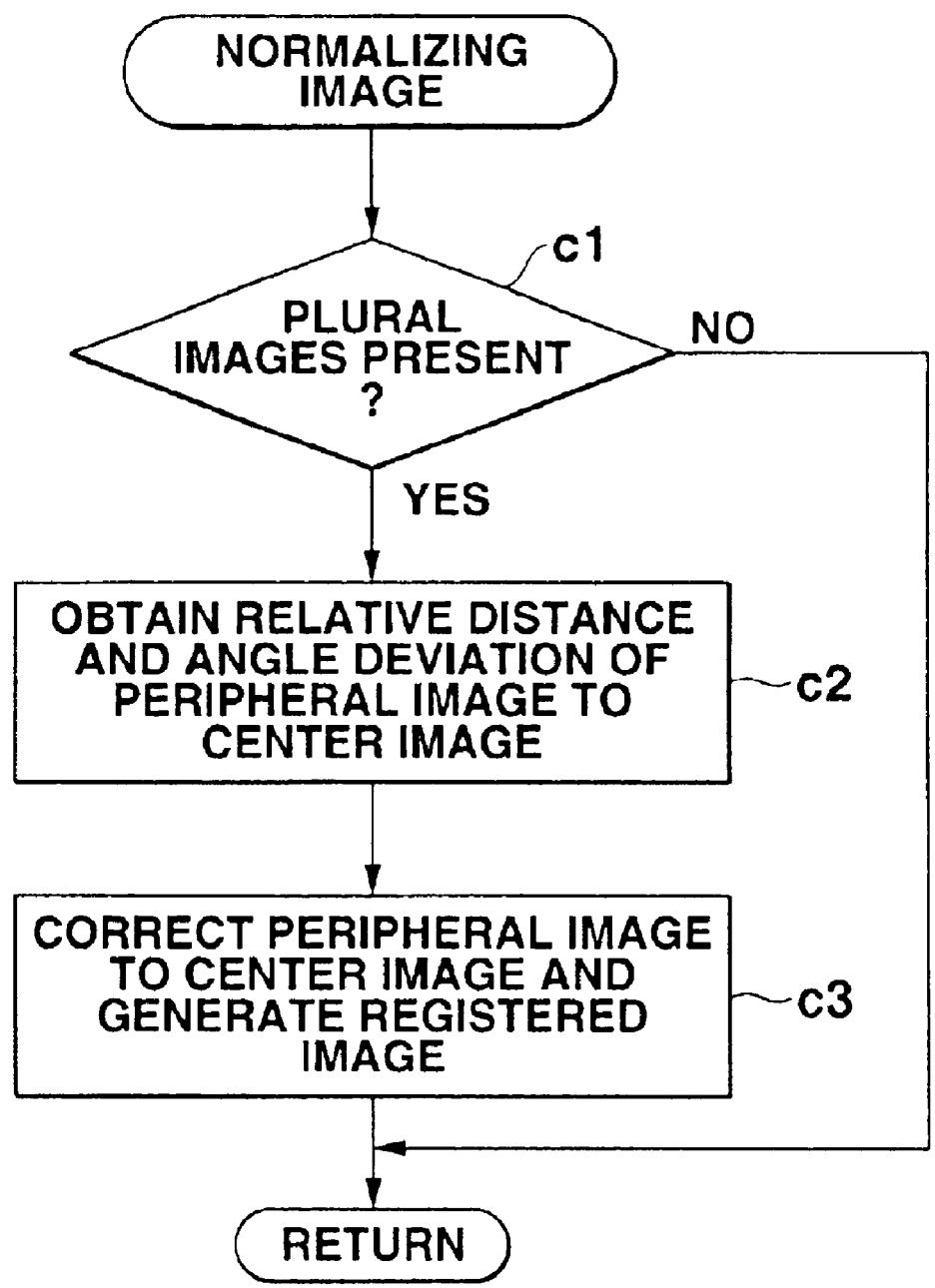
FIG. 24 is a flow chart showing image normalization processing in authentication station processing in fingerprint registration of the sixth embodiment.

In the case of the portable terminal 111, together with inputs of a name of the user targeted to be registered, external output enable/disable information, and external output enable terminal information, partial images of the user's fingerprints are input and transmitted sequentially plural times from the small sized reading device 116 (step a3). In the case of personal computer 112, together with inputs of the name of the user targeted to be registered, external output enable/disable information, and external output enable terminal information, the entire image of the user's fingerprint is input and transmitted from the fingerprint reading device 115 at one time. If the authentication station device 114 receives such input information (step b3), image normalization processing shown in FIG. 24 is carried out (step bc), and it is determined whether or not the fingerprint image of the user targeted to be registered is correctly input (step b4).

In this image normalization processing (FIG. 24), as shown in (A) of FIG. 16, if it is determined that a plurality of partial images have been received, the relative distance or angle deviation of each fingerprint image at the periphery with reference to the fingerprint image of the center part is obtained by an image recognition or image matching process (steps c1 and c2). Based on this process, as shown in (B) of FIG. 16, the fingerprint image of the periphery is combined to be superimposed on the fingerprint image of the center portion. As shown in (C) of FIG. 16, a registration image including the entire fingerprint is produced (step c3).

If the fingerprint image of the user targeted to be registered is input and received as one entire image from the fingerprint reading device 115 of the personal computer 112, the superimposition and combining of partial images are not carried out in normalization processing of the image, and it is determined whether or not the entire fingerprint image has been correctly input (steps c1 and b4).

If it is not determined that the fingerprint image of the user targeted to be registered has been correctly input because missing or deviation of an image is detected, for example, a guidance message for fingerprint input requirements is notified to the registration request terminal again, and the fingerprint image of the user targeted to be registered are repeatedly input, received, and normalized (steps b4 and b2).

If it is determined that the fingerprint image of the user targeted to be registered has been correctly input, the registration OK message is notified to the cellular phone 111 or personal computer 112 (steps b4 and b5). Then, the registration OK message is received at the terminal, and is displayed for confirmation (steps a4 and a5).

At the authentication station device 114, together with the name of the user targeted to be registered, external output enable/disable information, and external output enable terminal information, that have been input and received from the registration request terminal, the enter fingerprint image of the user targeted to be registered is associated as the registration fingerprint image "A", and the associated image is stored and registered in the registration fingerprint database device 123 (step b6: refer to FIG. 15).

Now, an operation for the authentication station device 14 to authenticate a fingerprint image in the network system will be described here.

Figure 25:
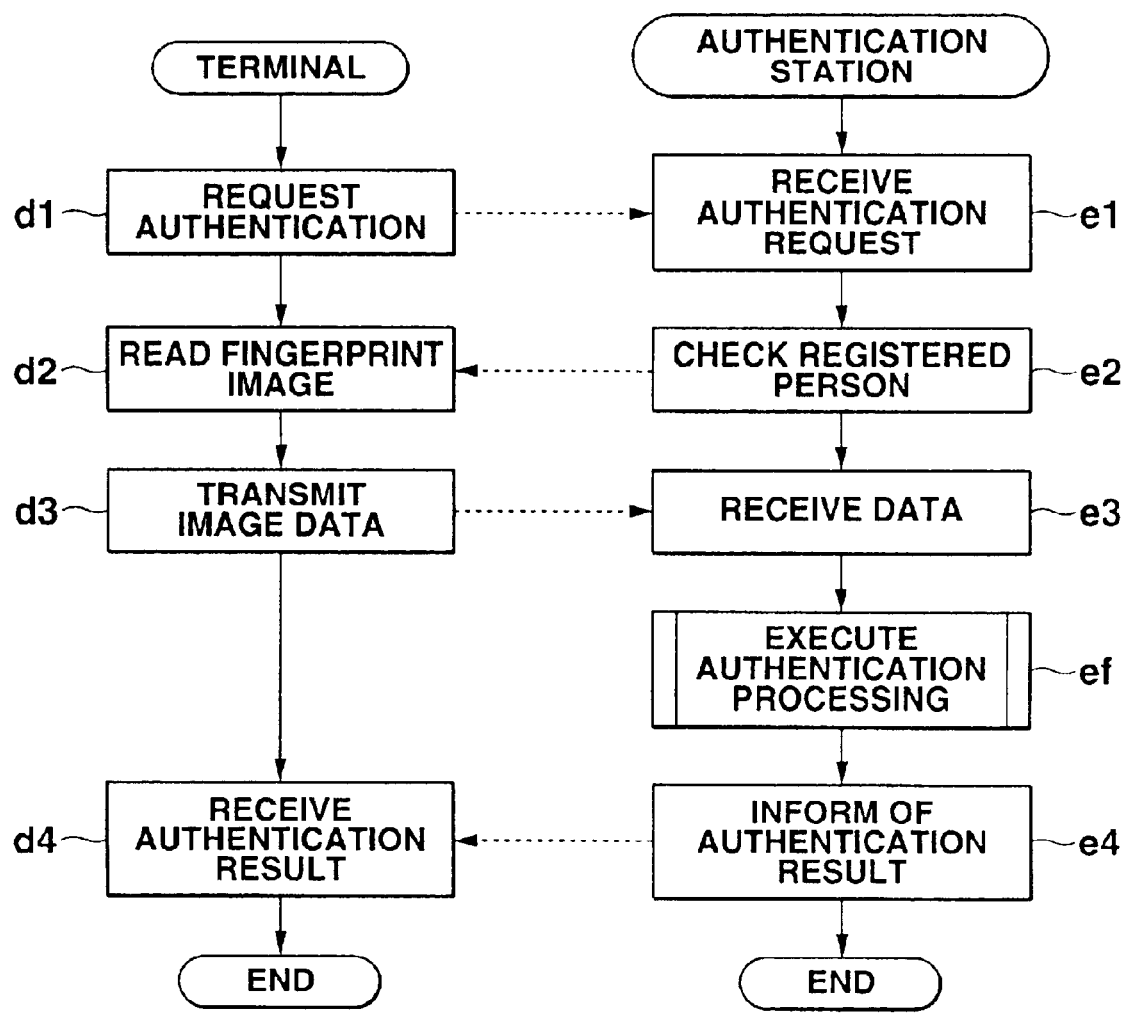
FIG. 25 is a flow chart showing terminal processing and authentication station processing to be associated with each other in fingerprint authentication of the sixth embodiment.

FIG. 25 is a flow chart showing terminal processing and authentication station processing to be associated with each other when fingerprint authentication is carried out in the network system.

In the cellular phone 111 or personal computer 112, if the user name is input, and its authentication request is input, the authentication request for which the registered user has been specified is transmitted from the authentication request terminal to the authentication station device 114 (step d1).

If the authentication station device 114 receives the authentication request (step e1), it is determined whether or not the name of received authentication request user is registered as registered user data in the registered fingerprint database device 123 (step e2), and reception of the authentication target data from the authentication request terminal is ready (step e3).

If the user's fingerprint image is read from the fingerprint reading devices 115 or 116 at the authentication request terminal (step d2), the data on the input fingerprint image is transmitted as the object fingerprint image "B" to the authentication station device 114 (step d3).

If the fingerprint image (object fingerprint image "B") transmitted from the authentication request terminal is received at the authentication station device 114 (step e3), authentication processing is carried out (step ef). Then, data on the authentication result indicating that authentication is OK or NG is notified to the authentication request terminal (step e4). At the authentication request terminal, the data on the authentication result notified from the authentication station device 114, and a message indicating that authentication is OK or NG is displayed for confirmation (step d4).

Now, fingerprint collation processing at the step "ef" will be described with reference to the flow chart shown in FIG. 26.

In this processing, it is determined whether or not the image size is equal to or greater than a predetermined size with reference to the received object fingerprint image "B" (step f1). If it is determined to be smaller than the predetermined size, it is handled as authentication disable (steps f1 and f7), and the determination result is notified to the authentication request terminal (step e4).

On the other hand, if it is determined that the received object fingerprint image "B" is equal to or greater than the predetermined size, the image is standardized so as to conform with the image specification of the registered fingerprint image "A" based on the data size, pixel pitch, gradation data, top and bottom classification data described in the header information (steps f1 and f2).

Next, an authentication template pattern is selected according to the image size of the object fingerprint image "B" (step f3). If the object fingerprint image "B" is the entire fingerprint image read from the fingerprint reading device 115 of the personal computer 112, a template pattern as shown in FIG. 19 is selected. In the case of an image read from the small sized fingerprint reading device 116 of the cellular phone 111, a template as shown in FIG. 21 is selected. As described above, the main template and sub-templates are disposed with reference to the object fingerprint image "B", and image data defined by each of these templates and a region having a maximum correlation are detected on the registered fingerprint image "A" (steps f4 and f5). Then, differences between a position relationship of the sub-template with reference to the main template disposed on the object fingerprint image "B" and a position relationship in each of the maximum correlation regions detected on the registered fingerprint image "A" are compared/collated with each other, and it is determined whether or not the object fingerprint is identical to the fingerprint of the authorized person (step f6).

According to the fingerprint authentication system, even in the case of employing the small sized fingerprint reading device 116 provided at the cellular phone 111, partial images of fingerprints separately input by a plurality of times are combined with each other, and the combined images are registered in the authentication station device 114. Thus, the registered fingerprint image "A" suitable to fingerprint authentication can be registered. As long as the entire fingerprint image is registered in the authentication station, even if a portion of a fingerprint image read by the small sized fingerprint reading device is displaced from the center of a finger, it is possible to ensure reliable authentication of identity.

Figure 27:
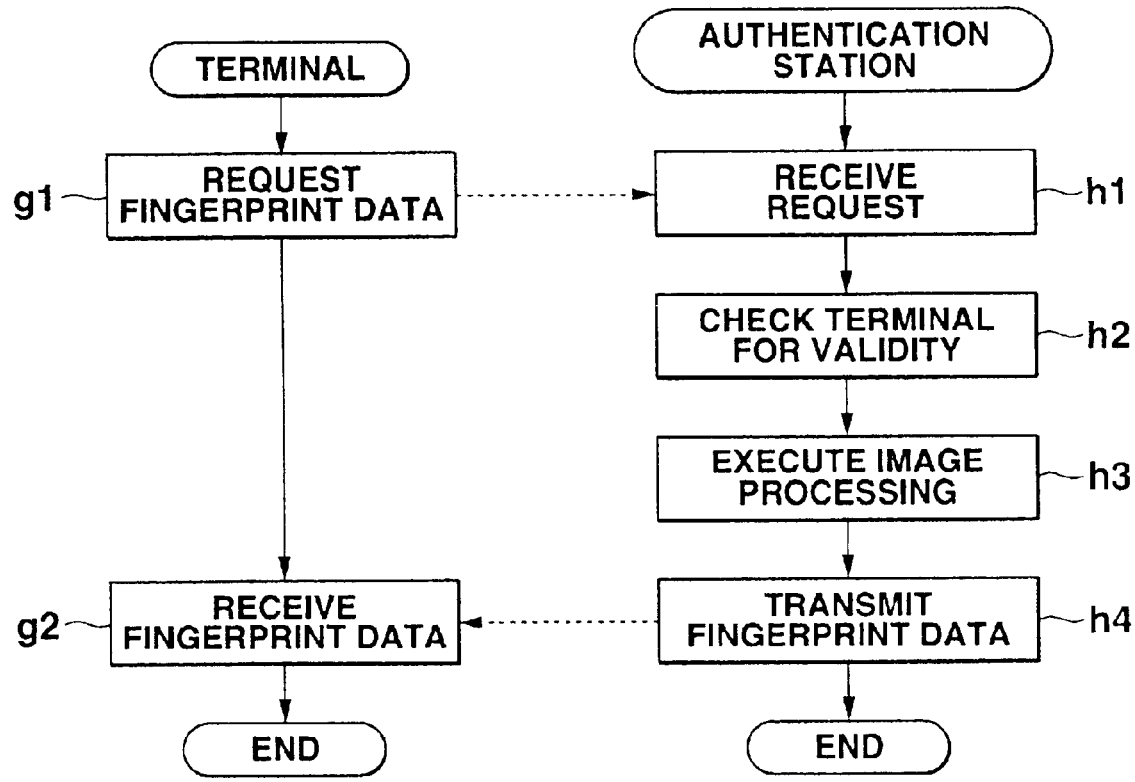
FIG. 27 is a flow chart showing terminal processing and authentication station processing to be associated with each other if the authentication station device transmits a fingerprint image to another terminal of the sixth embodiment.

Referring now to FIG. 27, a description will be given with respect to a case in which fingerprint authentication employing a unique authentication algorithm is carried out by the personal computer 112 or any other computer device that is located at the electronic mall/cyber shop 113 without employing the authentication station device 114 in the network system.

In the personal computer 112, if fingerprint authentication is carried out employing a unique authentication algorithm, it is required for the authentication station device 114 to transmit registered fingerprint data. In this case, image data for use in the unique authentication algorithm may be in accordance with specification different from that of the registered fingerprint data. Therefore, at the terminal 112 or 113, the name of the registered user targeted to be authenticated is input, and the image specification for a fingerprint image to be picked up is input. The fingerprint image data request is transmitted to the authentication station device 114 together with these items of data (step g1).

In the authentication station device 114 in which the fingerprint image data request has been received (step h1), it is determined and checked whether or not the request is associated with the name of the requested, registered user, and the terminal address of the fingerprint request source is registered as an external output enable terminal address in the registered fingerprint database device 123 or whether or not the fingerprint request terminal is valid (step h2).

Then, the fingerprint image data of the requested, registered user is read out from the registered fingerprint database device 123, the read out data is processed and converted into the requested image specification (for example, binary-level image) (step h3), and the processed and converted data is transmitted to the personal computer terminal 112 that is a fingerprint request source (step h4).

Then, if the fingerprint image data of the requested, registered user transmitted from the authentication station device 114 is received by personal computer 112 (step g2), individual authentication by fingerprint authentication with the object fingerprint image input from the fingerprint reading device 115 is carried out in accordance with an authentication algorithm using "characteristics/graphics authentication method", for example, based on the registered user's fingerprint image.

Figure 26:
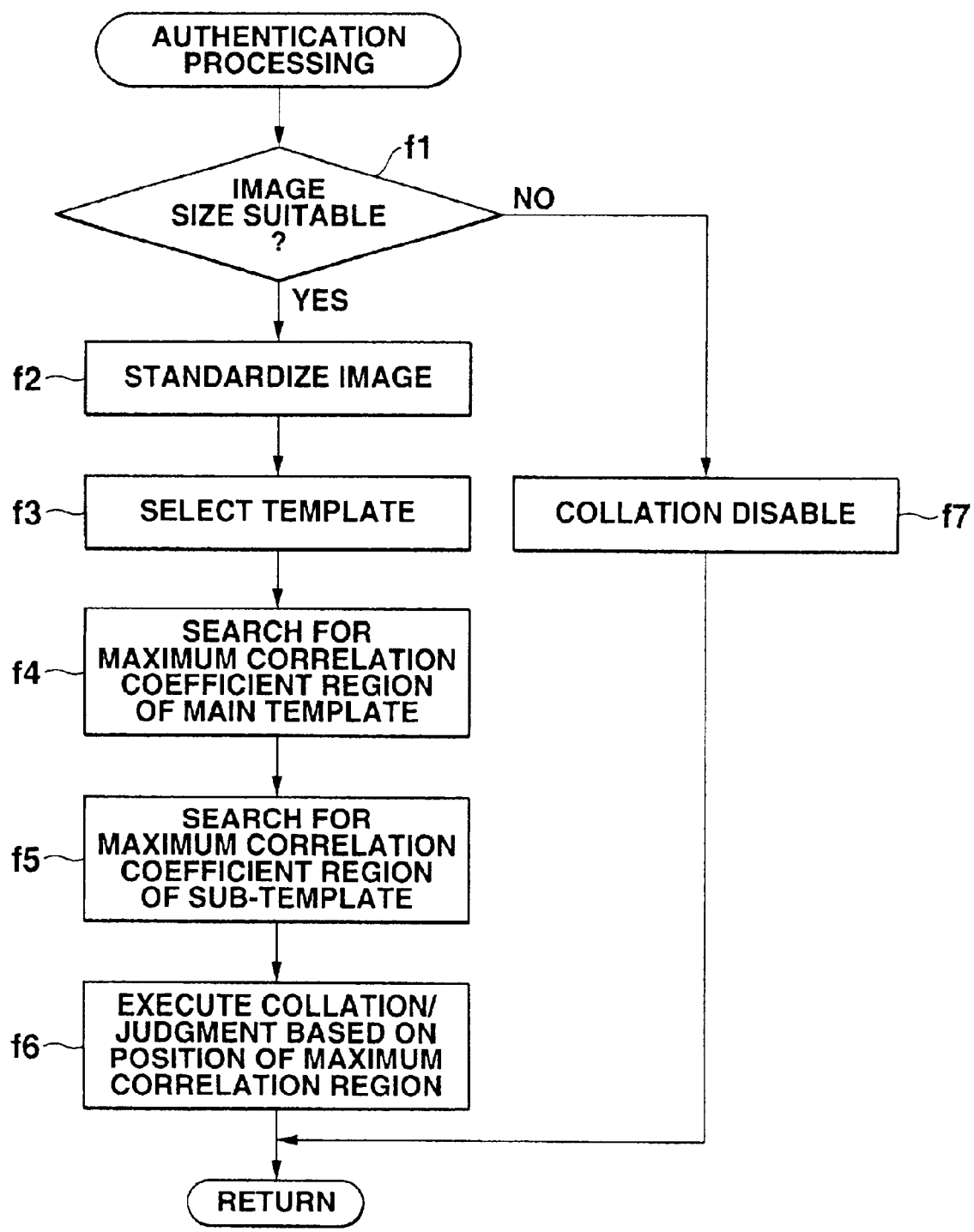
FIG. 26 is a flow chart showing fingerprint collation processing in authentication station processing in fingerprint authentication of the sixth embodiment.

Any of techniques described in the foregoing embodiments, i.e., techniques such as terminal processing and authentication station processing associated with fingerprint registration processing shown in the flow charts of FIG. 23 and FIG. 24; terminal processing and authentication station processing associated with fingerprint collation processing shown in FIG. 25 and FIG. 26; and terminal processing and authentication station processing associated with pickup processing of the registered fingerprint image shown in FIG. 27, can be delivered after being stored as programs that can be executed in a computer in an external storage medium such as memory card (such as ROM card or RAM card), magnetic disk (such as floppy disk or hard disk), optical disk (such as CD-ROM or DVD), or semiconductor memory. Then, each of the terminal devices 111, 112, and 113 or a computer of the authentication station device 114 reads the programs stored in the external storage medium into an incorporated memory by means of a storage medium reading device. Further, an operation is controlled by the thus read programs, whereby the fingerprint registration function or fingerprint authentication function and registered fingerprint pickup function described in the foregoing embodiments are achieved, and the similar processing using the previously described techniques can be executed.

Program data for achieving each of these techniques can be transmitted in the form of program codes over a network (e.g., Internet 110). The program data is received by a communication control section of the computer device connected to the network, whereby the above described fingerprint registration function or fingerprint authentication function, and registered fingerprint pickup function can be realized.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, the foregoing embodiments include the invention at various stages, and various inventions can be excerpted by using a proper combination of a plurality of disclosed constituent elements. For example, even if some constituent elements are omitted from all the constituent elements shown in the embodiments or if some constituent elements are combined with each other, a resultant combination of elements can be excerpted as an invention provided the problems described in the "Description of the Related Art" can be solved.

What is claimed is:

1. An electronic device comprising:

an image pickup unit including an image pickup element and a lens system;

a focus controller configured to change a distance between said image pickup element and said lens system in accordance with switching between an ordinary imaging mode and a fingerprint imaging mode;

a request input section configured to determine whether or not a request for fingerprint imaging is input; and a warning section configured to issue a warning if the fingerprint imaging mode is not set when it is determined by said request input section that the request for fingerprint imaging is input.

2. The electronic device according to claim 1, further comprising;
a light source provided inside of a body of said device and configured to emit light outward of the body through said lens system in the fingerprint imaging mode.

3. An electronic device comprising:
an image pickup unit including an image pickup lens and an image pickup element arranged on an image pickup axis of said image pickup lens, said image pickup unit being rotatably provided at a body of said device so that an imaging direction of said image pickup unit is oriented in an inward direction or an outward direction of the body of said device;
an image pickup window provided on a side face of the body of said device such that a fingerprint image of a finger pressed against said image pickup window is incident to the image pickup lens when the imaging direction of said image pickup unit is oriented in the inward direction of the body of said device;
a light source provided inside of the body of said device and configured to emit light outward of said body through said image pickup window;
a request input section configured to determine whether or not a request for fingerprint imaging is input; and
a warning section configured to issue a warning if the imaging direction of said image pickup unit is not oriented in the inward direction when it is determined by said request input section that the request for fingerprint imaging is input;
wherein an ordinary imaging mode is set if the imaging direction of said image pickup unit is oriented in the outward direction, and a fingerprint imaging mode is set if the imaging direction of said image pickup unit is oriented in the inward direction.

4. The electronic device according to claim 3, further comprising a mirror configured to guide the fingerprint image of the finger pressed against said image pickup window to said image pickup element when the imaging direction of said image pickup unit is oriented in the inward direction.

5. An electronic device comprising:
a slide cover mounted so as to cover one end of a body of said device and expose a part of the body of the device if the slide cover is opened;
an image pickup lens provided on a side face of the one end of the body of the device;
an image pickup element arranged inside of the body of said device and on an image pickup axis of said image pickup lens;
an image pickup window provided on a side face of said slide cover on the image pickup axis; and
a light source provided on the side face of the one end of the body of the device and configured to emit light outwardly of said slide cover through said image pickup window,
wherein an ordinary imaging mode is set if said slide cover covers the one end of the body of said device, and a fingerprint imaging mode is set if said slide cover is opened.

6. The electronic device according to claim 5, further comprising:
a request input section configured to determine whether or not a request for fingerprint imaging is input; and
a warning section configured to issue a warning if said slide cover is not opened when it is determined by said request input section that the request for fingerprint imaging is input.

7. A fingerprint authentication system comprising a terminal device and a fingerprint authentication device connected to each other via a network,
said terminal device comprising:
a fingerprint reader configured to read a fingerprint image of a user;
a transmitter configured to transmit a readable image size of the fingerprint reader to the fingerprint authentication device at a time of fingerprint registration;
a display configured to display a guidance message for requesting an input of fingerprint of an image size which is transmitted from the fingerprint authentication device at the time of fingerprint registration; and
a fingerprint transmitter configured to transmit the fingerprint image read by said fingerprint reader to said fingerprint authentication device, and
said fingerprint authentication device comprising:
a fingerprint receiver configured to receive the fingerprint image transmitted from said fingerprint transmitter;
a transmitting unit which transmits the guidance message to the terminal device in accordance with the readable image size transmitted from the terminal device at the time of fingerprint registration;
a synthesizing unit which synthesizes partial fingerprint images which are transmitted from the terminal device at plural times in accordance with the guidance message into the whole fingerprint image;
a memory configured to store the whole fingerprint image synthesized by the synthesizing unit; and
a collation section configured to collate the fingerprint image received by said fingerprint receiver with at least part of the whole fingerprint image based on a size of the fingerprint image received by said fingerprint receiver.

8. The fingerprint authentication system according to claim 7, wherein said collation section comprises:
a detector configured to detect a plurality of small regions in the reference fingerprint image having a maximum correlation with regard to the fingerprint image received by said fingerprint receiver; and
a determining section configured to determine identity between the fingerprint image received by said fingerprint receiver and the reference fingerprint image based on a position relationship of the plurality of small regions.

9. The fingerprint authentication system according to claim 7, wherein said fingerprint authentication device comprises a fingerprint processor configured to process the reference fingerprint image stored in said memory in a form suitable to a request from said terminal device, and transmit the image to said terminal device.

10. A fingerprint authentication device adapted to be connected to a terminal device via a network, the fingerprint authentication device comprising:
a fingerprint receiver configured to receive a partial fingerprint image transmitted from an external device;
a transmitter configured to transmit a guidance message for requesting an input of a fingerprint based on an image size which is transmitted from the terminal device at a time of fingerprint registration;
a synthesizing unit which synthesizes partial fingerprint images which are transmitted from the terminal device at plural times in accordance with the guidance message into the whole fingerprint image;

a memory configured to store the whole fingerprint image synthesized by the synthesizing unit;

a detector configured to detect a plurality of small regions in the whole fingerprint image having a maximum correlation with regard to the fingerprint image received by said fingerprint receiver; and a collation section configured to determine identity between the fingerprint image received by said fingerprint receiver and the whole fingerprint image based on a position relationship of the plurality of small regions.

11. The fingerprint authentication system according to claim 10, wherein said memory stores the reference fingerprint image of an entire fingerprint;

said fingerprint receiver receives a plurality of partial fingerprint images; and said collation section comprises a synthesizer configured to combine the plurality of partial fingerprint images received by said fingerprint receiver to produce an entire fingerprint image and collates the entire fingerprint image produced by said synthesizer with the reference fingerprint image of an entire fingerprint stored in said memory.

12. The fingerprint authentication system according to claim 11, wherein said fingerprint authentication device comprises a fingerprint processor configured to process the reference fingerprint image stored in said memory in a form suitable to a request from said terminal device, and transmit the image to said terminal device.

* * * * *